US010515768B2

(12) United States Patent
Ryhanen et al.

(10) Patent No.: US 10,515,768 B2
(45) Date of Patent: Dec. 24, 2019

(54) APPARATUS AND ASSOCIATED METHODS

(75) Inventors: Teuvo Tapani Ryhanen, Helsinki (FI); Di Wei, Cambridge (GB); Piers Andrew, Cambridge (GB); Andrew Peter Matthews, Cambridge (GB)

(73) Assignee: Lyten, Inc., Sunnyvale, CA (US)

( * ) Notice: Subject to any disclaimer, the term of this patent is extended or adjusted under 35 U.S.C. 154(b) by 219 days.

(21) Appl. No.: 13/482,377

(22) Filed: May 29, 2012

(65) Prior Publication Data
US 2013/0266856 A1 Oct. 10, 2013

Related U.S. Application Data

(63) Continuation-in-part of application No. 13/439,371, filed on Apr. 4, 2012, now Pat. No. 9,324,995.

(51) Int. Cl.
| | | |
|---|---|---|
| *H01M 4/48* | (2010.01) | |
| *H01M 4/64* | (2006.01) | |
| *H01M 4/04* | (2006.01) | |
| *H01M 4/58* | (2010.01) | |
| *H01G 9/00* | (2006.01) | |
| *H01G 9/042* | (2006.01) | |
| *H01G 11/70* | (2013.01) | |
| *H01G 11/06* | (2013.01) | |
| *H01G 11/26* | (2013.01) | |
| *H01M 4/70* | (2006.01) | |
| *H01M 10/04* | (2006.01) | |
| *H01M 10/052* | (2010.01) | |
| *H01M 10/058* | (2010.01) | |
| *H01G 9/025* | (2006.01) | |
| *H01G 9/048* | (2006.01) | |
| *H01G 11/56* | (2013.01) | |
| *H01G 9/04* | (2006.01) | |
| *H01M 12/08* | (2006.01) | |

(52) U.S. Cl.
CPC ............ *H01G 11/70* (2013.01); *H01G 11/06* (2013.01); *H01G 11/26* (2013.01); *H01M 4/04* (2013.01); *H01M 4/70* (2013.01); *H01M 10/04* (2013.01); *H01M 10/052* (2013.01); *H01M 10/058* (2013.01); *H01G 9/025* (2013.01); *H01G 9/048* (2013.01); *H01G 11/56* (2013.01); *H01G 2009/0412* (2013.01); *H01M 12/08* (2013.01); *Y02E 60/128* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 5,976,284 A | 11/1999 | Calvert et al. | 156/51 |
| 6,565,763 B1 | 5/2003 | Asakawa et al. | 216/56 |
| 6,768,246 B2 | 7/2004 | Pelrine et al. | 310/339 |
| 2002/0009649 A1* | 1/2002 | Sato et al. | 429/306 |
| 2002/0155327 A1 | 10/2002 | Faris | 429/9 |
| 2005/0155215 A1 | 7/2005 | Yoshino et al. | 29/623.1 |
| 2006/0008696 A1* | 1/2006 | Cha et al. | 429/38 |
| 2008/0138704 A1 | 6/2008 | Mizuta et al. | 429/203 |
| 2009/0026513 A1 | 1/2009 | Johansson | 257/295 |
| 2009/0311587 A1 | 12/2009 | Best et al. | 429/127 |
| 2010/0118243 A1 | 5/2010 | Majumdar et al. | 349/122 |
| 2010/0175354 A1* | 7/2010 | Mizukami et al. | 55/528 |
| 2011/0027648 A1 | 2/2011 | Rolison et al. | 429/209 |
| 2011/0059362 A1 | 3/2011 | West et al. | 429/219 |
| 2011/0097624 A1 | 4/2011 | Bhatt et al. | 429/163 |
| 2011/0171518 A1 | 7/2011 | Dunn et al. | 429/163 |
| 2011/0183180 A1 | 7/2011 | Yu et al. | 429/128 |
| 2011/0212545 A1 | 9/2011 | Leenders et al. | 438/3 |
| 2011/0227059 A1 | 9/2011 | Kim et al. | 257/43 |
| 2011/0272028 A1* | 11/2011 | Yun et al. | 136/263 |
| 2012/0100422 A1 | 4/2012 | Moriguchi et al. | 429/188 |

FOREIGN PATENT DOCUMENTS

| | | |
|---|---|---|
| CN | 201766149 U | 3/2011 |
| CN | 102354619 A | 2/2012 |
| EP | 0239846 A1 | 10/1987 |
| JP | 2001-151834 A | 6/2001 |
| JP | 2010-225432 A | 10/2010 |
| KR | 20120001456 A | 1/2012 |
| WO | WO-2007/059589 A1 | 5/2007 |
| WO | WO-2010/150857 A1 | 12/2010 |
| WO | WO-2011/014312 A1 | 2/2011 |

OTHER PUBLICATIONS

Baggetto, L., et al., "High Energy Density All-Solid-State Batteries: A Challenging Concept Towards 3D Integration", © 2008 WILEY-VCH Verlag GmbH & Co,.m KGaA, Weinheim, 10 pgs.

Crossland, E.J.W., et al., "A Bicontinuous Double Gyroid Hybrid Solar Cell", Nov. 22, 2008, ACS Publications, 17 pgs.

Notten, P.H.L., et al., "3-D Integrated All-Solid-State Rechareable Batteries", © 2007 WILEY-VCH Verlag GmbH & Co,.m KGaA, Weinheim, 4 pgs.

Zhang, H., et al., "Three-dimensional Bicontinuous Ultrafast-Charge and Discharge Bulk Battery Electrodes", Nature Nonotechnology, vol. 6, May 2011, 5 pgs.

Bates, F.S., et al., "Polymeric Bicontinuous Microemulsions" © 1997 The American Physical Society, 4 pgs.

Lee, D.H., et al., "Highly Ordered Nanoporous Template from Triblock Copolymer" ACSNANO, vol. 5, No. 2, 2011, 8 pgs.

Pushparaj, V.L., et al., "Flexible Energy Storage Devices Based on Nanocomposite Paper", PNAS, vol. 104, No. 34, Aug. 21, 2007, 4 pgs.

(Continued)

*Primary Examiner* — Ladan Mohaddes
(74) *Attorney, Agent, or Firm* — Dinsmore & Shohl LLP

(57) ABSTRACT

An apparatus including an open interconnected wall structure having one or more pores, the open interconnected wall structure including a first electrode material, the pores including an electrolyte and a second electrode material, wherein the electrolyte and second electrode material are supported on the first electrode material within the pores such that the first electrode material is separated from the second electrode material by the electrolyte to enable the generation and/or storage of electrical energy using the apparatus.

16 Claims, 14 Drawing Sheets

(56) References Cited

OTHER PUBLICATIONS

Cheah, S.K., et al., "Self-Supported Three-Dimensional Nonoelectrodes for Microbattery Applications", © 2009 American Chemical Society, 4 pgs.

Long, J.W., et al., "Three-Dimensional Battery Architectures", © 2004 American Chemical Society, 30 pgs.

Scherer, M.R.J., et al., "Enhanced Electrochromism in Gyroid-Structured Vanadium Pentoxide", © 2012 WILEY-VCH Verlag GmbH & Co,.m KGaA, Weinheim, 5 pgs.

Hu, Liangbing., et al., "Symmetrical MnO2-Carbon Nanotube-Textile Nanostructures for Wearable Pseudocapacitors with High Mass Loading", ACS Nano, 5,No. 11, 8904, 2011, whole document (10 pages).

Pelrine, Ron, et al., "Dielectric Elastomers: Generator Mode Fundamentals and Applications", 2001 SPIE, whole document (9 pages).

Hu, Liangbing, et al., "Stretchable, Porous, and Conductive Energy Textiles", 2010 American Chemical Society, whole document (7 pages).

Kaltseis, Rainer, et al., "Method for Measuring Energy Generation and Efficiency of Dielectric Elastomer Generators", 2011 American Institute of Physics, whole document (3 pages).

Yu, et al., "Solution-Processed Graphene/MnO2 Nanostructured Textiles for High-Performance Electrochemical Capacitors", American Chemical Society, 2011, pp. 2905-2911.

Shim, et al., "Smart Electronic Yarns and Wearable Fabrics for Human Biomonitoring Made by Carbon Nanotube Coating with Polyelectrolytes", American Chemical Society, 2008, pp. 4151-4157.

Choi, et al., "Fully Rollable Transparent Nanogenerators Based on Graphene Electrodes", Wiley Inter Science, 2010, pp. 2187-2192.

Czech, et al., "Energy Harvesting Using Dielectric Elastomers", 2010, whole document (6 pages).

Graf, et al., "Multilevel High Voltage Converter Driving Dielectric Elastomer Generators", 2011, whole document (10 pages).

Kil, et al., "A Facile Approach to Fabricate Self-Standing Gel-Polymer Electrolytes for Flexible Lithium-Ion Batteries by Exploitation of UV-Cured Trivalent/Monovalent Acrylate Polymer Matrices", Macromolecular Chemistry and Physics, 2011, pp. 2217-2223.

Novak, et al., "Electrochemically Active Polymers for Rechargeable Batteries", 1997, pp. 207-281.

Yao, et al., "Long cycle-life LiFePO4/Cu—Sn lithium ion battery using foam-type three-dimensional currentl collector", Journal of Power Sources 195, 2010, pp. 2077-2081.

\* cited by examiner

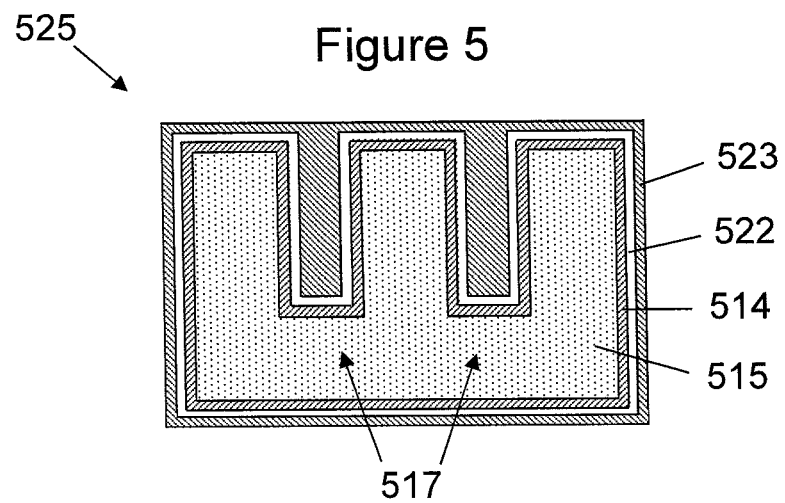
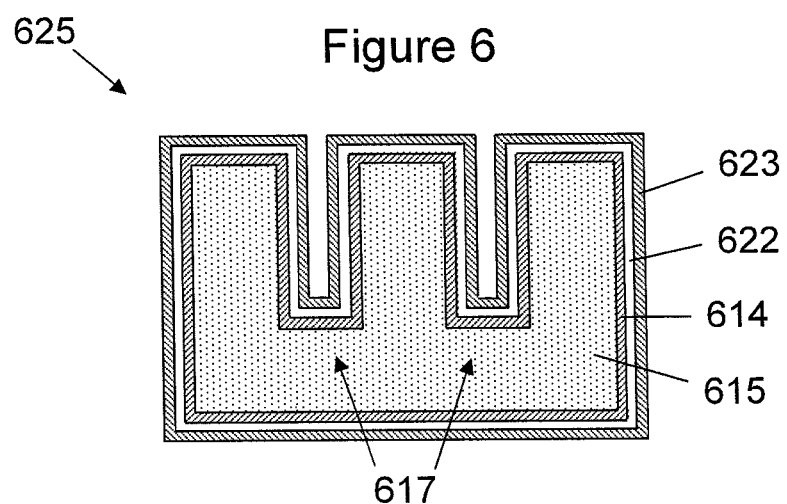

Figure 10
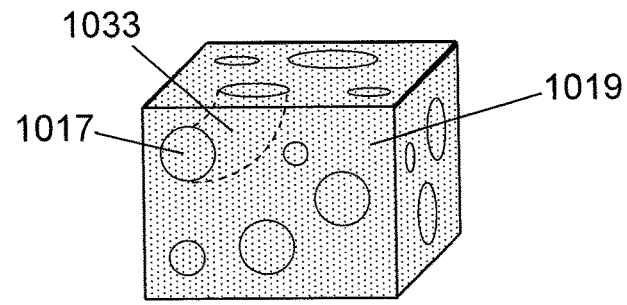
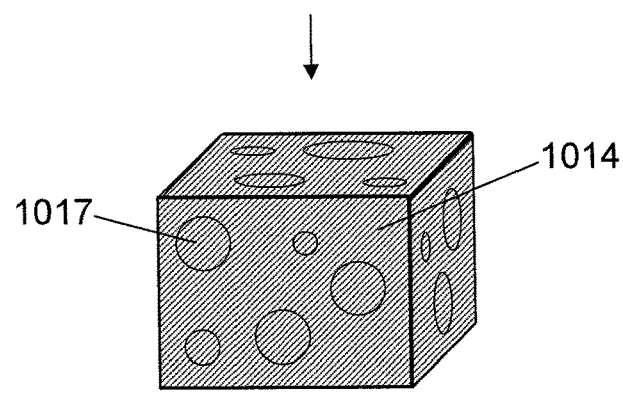
Figure 11
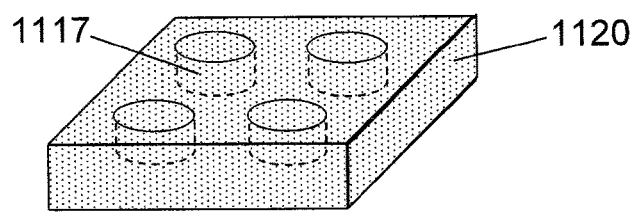
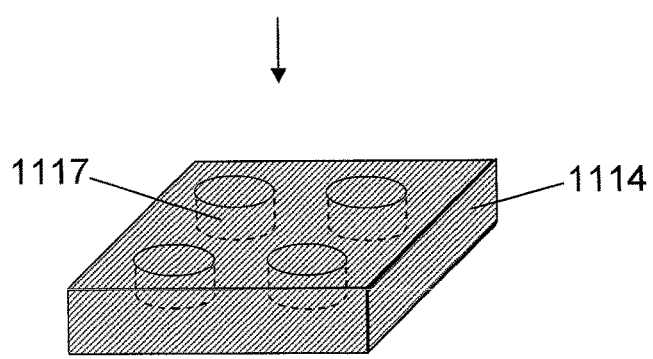

1323
1322
1314

1320

1324

1324

APPARATUS AND ASSOCIATED METHODS

CROSS-REFERENCE TO A RELATED PATENT APPLICATION

This patent application is a continuation-in-part of U.S. patent application Ser. No. 13/439,371, filed Apr. 4, 2012.

TECHNICAL FIELD

The present disclosure relates to the field of electrical storage cells, associated methods and apparatus, and in particular concerns a high surface area electrode on which an electrolyte and second electrode are deposited to form an electrical storage cell (battery, capacitor or battery-capacitor hybrid) with a compact structure and increased storage density and capacity. The cell may form part of an electronic device, in particular, so-called hand-portable electronic devices which may be hand-held in use (although they may be placed in a cradle in use). Such hand-portable electronic devices include mobile phones and so-called Personal Digital Assistants (PDAs).

The portable electronic devices may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Energy storage density and capacity are important parameters of any electrical storage apparatus. As portable electronic devices become ever more power hungry, greater demands are being placed on the storage density and capacity of the batteries and capacitors which power these devices. Various high surface area materials have been considered for forming the electrodes of next generation storage cells. Examples include activated carbon, carbon nanotubes, and metal/semiconductor nanowires. High surface area materials increase the electrical storage density/capacity by increasing the area of the electrode which is in contact with the electrolyte, thereby facilitating the generation and/or storage of electrical energy. One problem associated with such materials, however, is their particulate form, which reduces the structural integrity of the electrode and requires the use of additional binders. Such binders increase the cost and complexity of the fabrication process, and may also increase the electrical resistance of the electrode.

The apparatus and methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising an open interconnected wall structure having one or more pores, the open interconnected wall structure comprising a first electrode material, the pores comprising an electrolyte and a second electrode material, wherein the electrolyte and second electrode material are supported on the first electrode material within the pores such that the first electrode material is separated from the second electrode material by the electrolyte to enable the generation and/or storage of electrical energy using the apparatus.

The term "open" in reference to the open interconnected wall structure may be taken to mean that one or more of the pores on the exterior allow access to the internal surface area of the structure. The term "interconnected" in reference to the open interconnected wall structure may be taken to mean that at least some of the walls of the structure are physically connected to one another (i.e. they form a continuous structure).

The electrolyte may form a coating on the open interconnected wall structure. The second electrode material may substantially fill the remaining volume of the pores. The electrolyte may be a solid electrolyte or gel electrolyte (e.g. an electrolyte comprising one or more of lithium phosphorous oxynitride, poly(ethylene oxide) derivatives, borate ester groups, and titanium dioxide).

The first and second electrode materials may each comprise an active material. The first and/or second electrode material may comprise a charge collection material. The active material may in physical contact with the charge collection material.

The term "active material" may be taken to mean an electrode material which takes part in the charging/discharging mechanism of the apparatus. In a battery, for example, the active material may be an electrode material which participates in an electrochemical reaction or intercalation mechanism. In a supercapacitor, on the other hand, the active material may be an electrode material which participates in the formation of an electric double layer.

The charge collection material may comprise one or more of a metal and a semiconductor. The metal may comprise one or more of gold, silver, nickel and copper.

The first electrode material may form the open interconnected wall structure. The open interconnected wall structure may comprise a substrate on which the first electrode material is supported.

The open interconnected wall structure may have a gyroid structure. The gyroid structure may be trigonometrically approximated by:

$$\cos x \cdot \sin y + \cos y \cdot \sin z + \cos z \cdot \sin x = 0 \qquad \text{Equation 1}$$

(where x, y and z are the three spatial directions)

Some or all of the pores may be interconnecting. Some or all of the pores may form through channels within the open interconnected wall structure. Some or all of the pores may form blind channels within the open interconnected wall structures. Some or all of the pores may be arranged periodically. Some or all of the pores may have a diameter of less than 2 nm (i.e. microporous). Some or all of the pores may have a diameter of between 2 nm and 50 nm inclusive (i.e. mesoporous). Some or all of the pores may have a diameter of greater than 50 nm (i.e. macroporous).

The first electrode material, electrolyte and/or second electrode material within one pore may be different from the first electrode material, electrolyte and/or second electrode material within another pore.

The apparatus may comprise a plurality of the open interconnected wall structures electrically connected to one another. The first electrode material, electrolyte and/or second electrode material of one open interconnected wall structure may be different from the first electrode material, electrolyte and/or second electrode material of another open interconnected wall structure.

The expression "generation of electrical energy" may be taken to encompass the redox reactions and intercalation mechanisms associated with batteries and battery-capacitor hybrids, whilst the expression "storage of electrical energy" may be taken to encompass the charge separation associated with capacitors and battery-capacitor hybrids.

The apparatus may be an electrical storage apparatus. The apparatus may be one or more of a battery (primary or secondary battery), a capacitor (electrostatic, electrolytic, or supercapacitor), and a battery-capacitor hybrid. The battery may be one or more of a lithium-sulphur battery and a lithium-air battery.

According to a further aspect, there is provided a device comprising any apparatus described herein. The device may be an electronic device, a portable electronic device, a portable telecommunications device, and a module for any of the aforementioned devices.

The device may comprise a solar cell configured to convert energy from electromagnetic radiation incident upon the solar cell into electrical energy. The apparatus may be configured to store said electrical energy. The solar cell may form a coating on the external surface of the apparatus.

According to a further aspect, there is provided a method of making an apparatus, the method comprising depositing an electrolyte and a second electrode material into one or more pores of an open interconnected wall structure comprising a first electrode material, the pores comprising the electrolyte and the second electrode material, wherein the electrolyte and second electrode material are supported on the first electrode material within the pores such that the first electrode material is separated from the second electrode material by the electrolyte to enable the generation and/or storage of electrical energy using the apparatus.

The method may comprise forming the open interconnected wall structure before deposition of the electrolyte and second electrode material.

Forming the open interconnected wall structure may comprise: depositing the first electrode material in the interconnected spaces between and defined by a plurality of particles of a lattice to create an interconnected wall structure comprising the first electrode material; and removing the particles to create one or more pores in the interconnected wall structure to create an open interconnected wall structure comprising the first electrode material. Removing the particles may comprise one or more of etching, melting and dissolving the particles. Forming the open interconnected wall structure may further comprise etching the first electrode material before removing the particles (e.g. to allow access to the particles).

Forming the open interconnected wall structure may further comprise etching the first electrode material after removing the particles (e.g. to increase the surface area of the open interconnected wall structure).

Forming the open interconnected wall structure may comprise coating the surfaces of a plurality of particles of a lattice, a block-copolymer, a sponge, or a base substrate with the first electrode material, the lattice, the block co-polymer, the sponge, or the base substrate having an open interconnected wall structure comprising one or more pores, the coating providing an open interconnected wall structure comprising the first electrode material.

Forming the open interconnected wall structure may further comprise etching the base substrate to produce the one or more pores. Forming the open interconnected wall structure may further comprise removing the particles, the sponge, or the base substrate after coating the surfaces (e.g. to reduce the weight of the apparatus and/or to increase the surface area of the open interconnected wall structure). Removing the particles, the sponge, or the base substrate may comprise one or more of etching, melting and dissolving the particles, the sponge, or the base substrate. Forming the open interconnected wall structure may further comprise etching the first electrode material before removing the particles, the sponge, or the base substrate (e.g. to allow access to the particles, the sponge, or the base substrate). Forming the open interconnected wall structure may comprise etching the first electrode material after removing the particles, the sponge, or the base substrate (e.g. to increase the surface area of the open interconnected wall structure).

To form a porous structure using a block copolymer one can cast a thin film (e.g. 100's nm to micrometers in thickness) of the block copolymer which then phase separates into the desired morphology consisting of two or more phases on the nanoscale. You can then remove one of the polymer phases (chemical etch, UV exposure depending on the polymer) to leave a porous scaffold. This can then be filled with the desired material or materials (e.g. by Atomic Layer Deposition or electrochemical deposition). The remaining polymer scaffold may then itself be removed and the resulting volume possibly filled with another desired material in similar fashion. In the case of energy storage devices, one could deposit the block copolymer film on a (metallic) charge collector layer and proceed from there.

The particles of the lattice may or may not be spherical particles.

The first electrode material may be deposited using one or more of atomic layer deposition, chemical vapour deposition, and electrochemical deposition.

According to a further aspect, there is provided an apparatus comprising means for acting as a support with one or more pores, the means for acting as a support comprising means for acting as a first electrode, the one or more pores comprising means for acting as an electrolyte and a means for acting as a second electrode material, wherein the means for acting as an electrolyte and means for acting as a second electrode material are supported on the means for acting as a first electrode material within the pores such that the means for acting as a first electrode material is separated from the means for acting as a second electrode material by the means for acting as an electrolyte to enable the generation and/or storage of electrical energy using the apparatus.

According to a further aspect, there is provided an apparatus comprising a substrate and an active material, the substrate comprising an open interconnected wall structure of electrically conductive material having one or more pores, the open interconnected wall structure providing the substrate upon which the active material is supported, wherein the active material comprises an electrically insulating lithium-based compound configured for use in generating and/or storing electrons, and wherein the open interconnected wall structure is configured to act as a charge collector for the generated and/or stored electrons through which an electrical path for the electrons is provided.

The term "electrically insulating" in reference to the lithium-based compound may be taken to mean that the lithium-based compound exhibits zero or a relatively low electrical conductivity. The term "open" in reference to the open interconnected wall structure may be taken to mean that one or more of the pores on the exterior allow access to the internal surface area of the structure. The term "interconnected" in reference to the open interconnected wall structure may be taken to mean that at least some of the walls of the structure are in physical (and therefore electrical) contact with one another.

The substrate may be formed from an open interconnected wall structure of electrically conductive material. On the other hand, the substrate may comprise an open interconnected wall structure upon which a coating of electrically conducting material is deposited. In such a case, the open interconnected wall structure may not itself be electrically conductive, but the coating is. Either way, the substrate comprising the open interconnected wall structure can be used to support the active material and may act as a charge collector to provide an electrical path for the generated electrons.

The open interconnected wall structure may have a gyroid structure. The gyroid structure may be trigonometrically approximated by:

$$\cos x \cdot \sin y + \cos y \cdot \sin z + \cos z \cdot \sin x = 0 \qquad \text{Equation 1}$$

(where x, y and z are the three spatial directions)

Some or all of the pores may be interconnecting. Some or all of the pores may form through channels within the substrate. Some or all of the pores may form blind channels within the substrate. Some or all of the pores may have a diameter of less than 2 nm (i.e. microporous). Some or all of the pores may have a diameter of between 2 nm and 50 nm inclusive (i.e. mesoporous). Some or all of the pores may have a diameter of greater than 50 nm (i.e. macroporous). Some or all of the pores may be arranged periodically.

The insulating lithium-based compound may comprise one or more of lithium sulphide and lithium oxide.

The active material may form a coating on the open interconnected wall structure of electrically conductive material. The term "active material" may be taken to mean an electrode material which takes part in the charging/discharging mechanism of the apparatus. In a battery, for example, the active material may be an electrode material which participates in an electrochemical reaction or intercalation mechanism. In a supercapacitor, on the other hand, the active material may be an electrode material which participates in the formation of an electric double layer.

The electrically conductive material may comprise one or more of a metal and a semiconductor. The metal may comprise one or more of gold, silver, nickel, aluminium and copper.

The apparatus may be configured for the generation and/or storage of electrons. The expression "generation of electrons" may be taken to encompass the redox reactions and intercalation mechanisms associated with batteries and battery-capacitor hybrids, whilst the expression "storage of electrons" may be taken to encompass the charge separation associated with capacitors and battery-capacitor hybrids. The apparatus may be one or more of an electrical storage apparatus and an electrode for an electrical storage apparatus. The electrical storage apparatus may be one or more of a battery (primary or secondary battery), a capacitor (electrostatic, electrolytic, or supercapacitor), and a battery-capacitor hybrid. The electrical storage apparatus may be one or more of a lithium-sulphur battery and a lithium-air battery.

According to a further aspect, there is provided a device comprising any apparatus described herein. The device may be an electronic device, a portable electronic device, a portable telecommunications device, and a module for any of the aforementioned devices.

According to a further aspect, there is provided a method of making an apparatus, the method comprising depositing an active material on top of a substrate comprising an open interconnected wall structure of electrically conductive material having one or more pores, wherein the active material comprises an electrically insulating lithium-based compound configured for use in generating and/or storing electrons, and wherein the open interconnected wall structure is configured to act as a charge collector for the generated and/or stored electrons through which an electrical path for the electrons is provided.

The method may comprise forming the substrate before deposition of the active material.

Forming the substrate may comprise: depositing an electrically conductive material in the interconnected spaces between and defined by a plurality of particles of a lattice to create an interconnected wall structure of electrically conductive material; and removing the particles to create one or more pores in the interconnected wall structure to provide an open interconnected wall structure of electrically conductive material. Removing the particles may comprise one or more of etching, melting and dissolving the particles. Forming the substrate may comprise etching the electrically conductive material before removing the particles (e.g. to allow access to the particles). Forming the substrate may comprise etching the electrically conductive material after removing the particles (e.g. to increase the surface area of the open interconnected wall structure).

Forming the substrate may comprise coating the surfaces of a plurality of particles of a lattice, a block-copolymer, a sponge, or a base substrate with an electrically conductive material, the lattice, the block co-polymer, the sponge, or the base substrate having an open interconnected wall structure comprising one or more pores, the coating providing an open interconnected wall structure of electrically conductive material. Forming the substrate may comprise etching the base substrate to produce the one or more pores. Forming the substrate may comprise removing the particles, the block-copolymer, the sponge, or the base substrate after coating the surfaces (e.g. to reduce the weight of the apparatus and/or to increase the surface area of the open interconnected wall structure). Removing the particles, the block-copolymer, the sponge, or the base substrate may comprise one or more of etching, melting and dissolving the particles, the block-copolymer, the sponge, or the base substrate. Forming the substrate may comprise etching the electrically conductive material before removing the particles, the block-copolymer, the sponge, or the base substrate (e.g. to allow access to the particles, the block-copolymer, the sponge, or the base substrate). Forming the substrate may comprise etching the electrically conductive material after removing the particles, the block-copolymer, the sponge, or the base substrate (e.g. to increase the surface area of the open interconnected wall structure).

The particles of the lattice may or may not be spherical particles.

The active material may be deposited using one or more of atomic layer deposition, chemical vapour deposition, and electrochemical deposition.

The steps of any method disclosed herein do not have to be performed in the exact order disclosed, unless explicitly stated or understood by the skilled person.

According to a further aspect, there is provided a computer program (which may or may not be recorded on a carrier), the computer program comprising computer code configured to perform any method described herein.

The apparatus may comprise a processor configured to process the code of the computer program. The processor may be a microprocessor, including an Application Specific Integrated Circuit (ASIC).

The present disclosure includes one or more corresponding aspects, example embodiments or features in isolation or in various combinations whether or not specifically stated (including claimed) in that combination or in isolation. Corresponding means and corresponding functional units (e.g. supporter) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 5 illustrates schematically one embodiment of an electrical storage apparatus;

FIG. 6 illustrates schematically another embodiment of an electrical storage apparatus;

FIG. 10 illustrates schematically one method of forming an open interconnected wall structure using a sponge comprising one or more pores;

FIG. 11 illustrates schematically one method of forming an open interconnected wall structure using a base substrate comprising one or more pores;

DESCRIPTION OF SPECIFIC ASPECTS/EMBODIMENTS

In electrical circuits, batteries and capacitors are used to provide other components with electrical power. These power supplies operate in different ways, however.

Figure 1A:
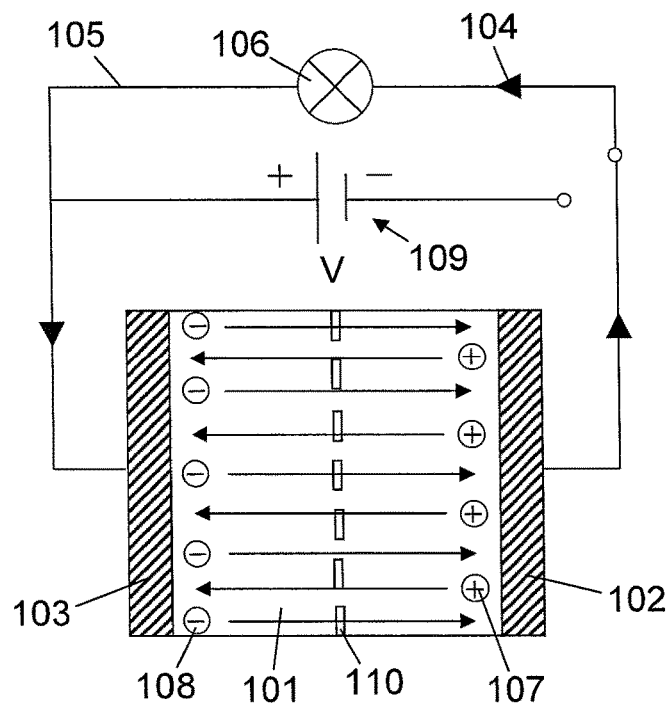
FIG. 1a illustrates schematically the discharge process of a conventional battery.

Batteries use electrochemical reactions to generate electricity. The discharge process of a conventional battery is shown in FIG. 1a. Batteries comprise two electrical terminals (electrodes 102, 103) separated by an electrolyte 101. A battery may also contain a separator 110 to prevent direct physical contact between the electrodes, which is particularly important when liquid electrolytes are used. At the negative electrode (the anode 102), an oxidation reaction takes place which produces electrons. These electrons flow round an external circuit 105 (indicated by the arrows 104) from the anode 102 to the positive electrode (the cathode 103) causing a reduction reaction to take place at the cathode 103. The flow of electrons can be used to power one or more electrical components 106 in the external circuit 105. The oxidation and reduction reactions may continue until the reactants are completely converted. Importantly though, unless electrons are able to flow from the anode 102 to the cathode 103 via the external circuit 105, the electrochemical reactions cannot take place. This allows batteries to store electricity for long periods of time. As the electrons flow round the external circuit from the anode 102 to the cathode 103, a negative charge cloud develops in the electrolyte 101 around the cathode 103, and a positive charge cloud develops in the electrolyte 101 around the anode 102. Positive 107 and negative 108 ions in the electrolyte 101 move to neutralise these charge clouds, allowing the reactions, and the flow of electrons, to continue. Without the ions 107, 108 from the electrolyte 101, the charge clouds around each electrode 102, 103 would inhibit the generation of electricity.

Figure 1B:
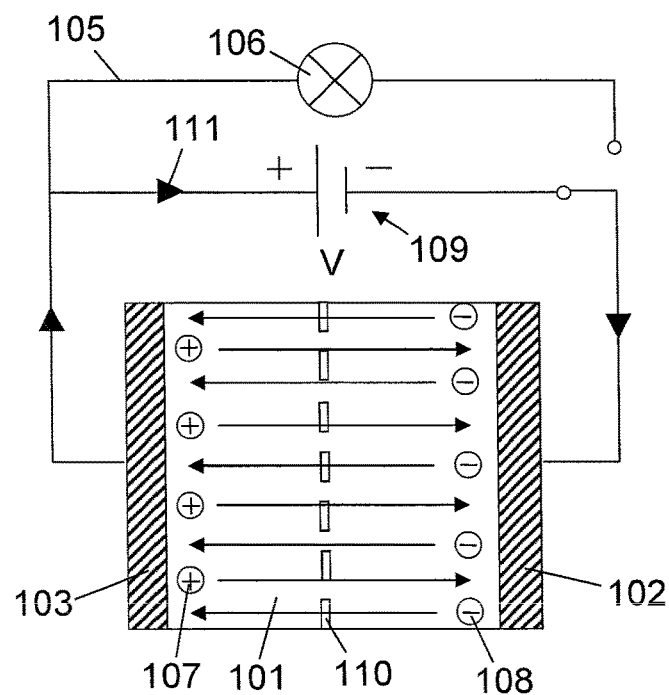
FIG. 1b illustrates schematically the charging process of a conventional battery.

A primary cell is any kind of battery in which the electrochemical reaction is irreversible. These are used as disposable batteries. With secondary batteries, on the other hand, the electrochemical reaction is reversible, meaning that the chemical reactants can be restored to their original states. These are used as rechargeable batteries. The charging process of a conventional rechargeable battery is shown in FIG. 1b. To charge the battery, a potential difference is applied between the anode 102 and cathode 103. The positive terminal of the charger 109 strips electrons from the cathode 103 and returns them to the anode 102 (indicated by the arrows 111), inducing chemical reactions at the electrode-electrolyte interface. Again, to compensate for the transfer of charge, positive 107 and negative 108 ions in the electrolyte 101 move between the electrodes 102, 103 in opposite directions to before.

The current and voltage generated by a battery is directly related to the materials used for the electrodes and electrolyte. The ability of a material to lose or gain electrons with respect to another material is known as its electrode potential. The strengths of oxidising and reducing agents are indicated by their standard electrode potentials. Materials with a positive electrode potential are used to form the anode, whilst those with a negative electrode potential are used to form the cathode. The greater the difference between the anode and cathode potentials, the greater the amount of electrical energy that can be produced by the cell.

Lithium appears at the top of the electrochemical series (large negative electrode potential), indicating that it is the strongest reducing agent. Likewise, fluorine appears at the bottom of the electrochemical series (large positive electrode potential), indicating that it is the strongest oxidising agent. As a result of lithium's high electrode potential, lithium batteries are capable of producing voltages of nearly 4V, over twice the voltage of a zinc-carbon or alkaline battery. Depending on the choice of materials for the anode, cathode and electrolyte, the current, voltage, capacity, life and safety of a lithium battery can change dramatically.

A lithium-ion battery is a different type of rechargeable battery which uses a lithium ion "intercalation" mechanism rather than traditional redox reactions. This involves the insertion of lithium ions into and out of the crystal structure of the electrodes as the ions pass back and forth between the electrodes during charging and discharging. To achieve this, the electrodes require open crystal structures which allow the insertion and extraction of lithium ions, and the ability to accept compensating electrons at the same time. Such electrodes are called "intercalation hosts". Lithium-ion batteries are currently one of the most popular types of battery for portable electronics because they exhibit one of the best energy-to-weight ratios, no memory effect, and a slow loss of charge when not in use.

In a typical lithium-ion battery, the anode is made from carbon, the cathode is a metal oxide, and the electrolyte is a lithium salt in an organic solvent. Commercially, the most popular anode material is graphite, and the cathode is generally one of three materials: a layered oxide (such as lithium cobalt oxide), one based on a polyanion (such as lithium iron phosphate), or a spinel (such as lithium manganese oxide). The electrolyte is typically a mixture of organic carbonates such as ethylene carbonate or diethyl carbonate containing complexes of lithium ions. These non-aqueous electrolytes often comprise non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

Figure 2A:
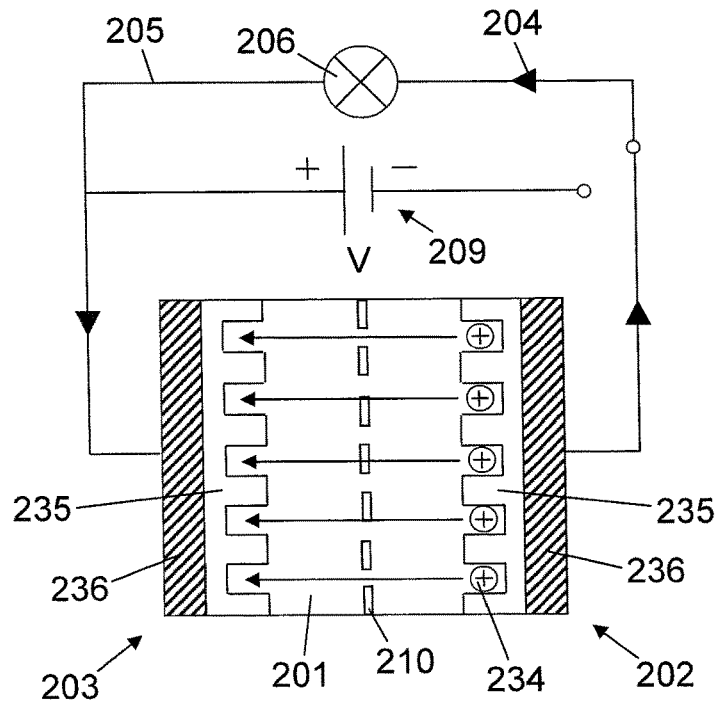
FIG. 2a illustrates schematically the discharge process of a lithium-ion battery.
Figure 2B:
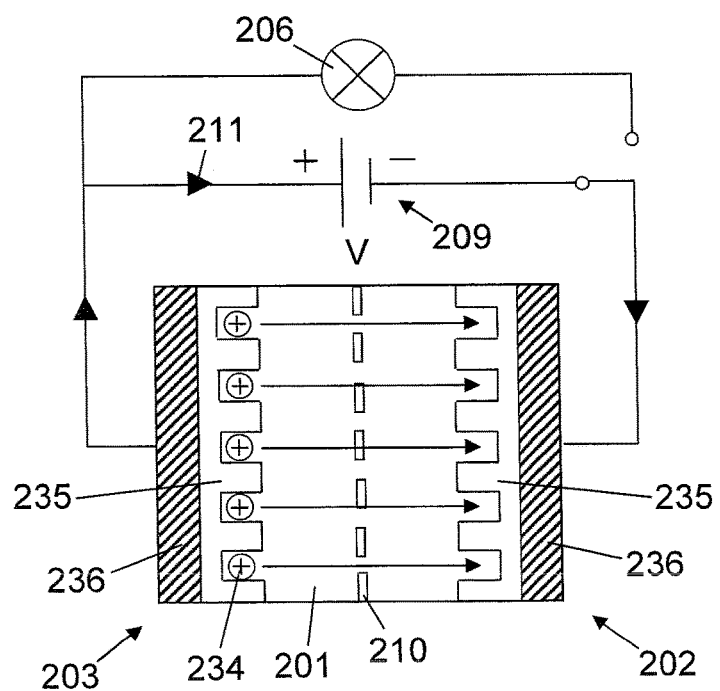
FIG. 2b illustrates schematically the charging process of a lithium-ion battery.

FIGS. 2a and 2b illustrate schematically the discharge and charging processes of a lithium-ion battery, respectively. As shown in the figures, the anode 202 and cathode 203 each comprise an open-crystal intercalation material 235 deposited on top of a charge-collecting substrate 236. During discharge, lithium ions 234 are extracted from the anode 202, migrate across the electrolyte 201, and are inserted into the crystal structure of the cathode 203. At the same time, compensating electrons travel in the external circuit (in a direction indicated by the arrows 204) and are accepted by the cathode 203 to balance the reaction. This process is reversible. During charging, an external electrical power source (the charger 209) applies a potential difference between the electrodes 202, 203 forcing the electrons to travel in the opposite direction (indicated by the arrows 211). The lithium ions 234 are then extracted from the cathode 203, migrate across the electrolyte 201, and are inserted back into the crystal structure of the anode 202.

In a lithium-ion battery, the lithium ions are transported to and from the cathode and anode, with the transition metal, cobalt (Co), in $Li_xCoO_2$ being oxidised from $Co^{3+}$ to $Co^{4+}$ during charging, and reduced from $Co^{4+}$ to $Co^{3+}$ during discharge. The anode and cathode half-reactions for a lithium-ion battery comprising a graphite anode and a lithium cobalt oxide cathode are as follows:

$$\text{Anode } xLi^+ + xe^- + 6C \rightleftharpoons Li_xC_6 \quad \text{Equation 2}$$

$$\text{Cathode } LiCoO_2 \rightleftharpoons Li_{1-x}CoO_2 + xLi^+ + xe^- \quad \text{Equation 3}$$

The overall reaction has its limits, however. Overdischarging the lithium-ion battery can supersaturate the lithium cobalt oxide, leading to the production of lithium oxide, by the following irreversible reaction:

$$Li^+ + LiCoO_2 \rightarrow Li_2O + CoO \quad \text{Equation 4}$$

whilst overcharging the lithium-ion battery can lead to the synthesis of $Co^{4+}$ by the following irreversible reaction:

$$LiCoO_2 \rightarrow Li^+ + CoO_2 \quad \text{Equation 5}$$

In contrast to batteries, capacitors store charge electrostatically, and are not capable of generating electricity. A relatively new type of capacitor known as a "supercapacitor" (also known as an electric double layer capacitor, an ultracapacitor, a pseudocapacitor, and an electrochemical double layer capacitor) offers greater energy storage than a conventional or electrolytic capacitor, and is becoming increasingly popular for portable electronic applications.

Figure 3A:
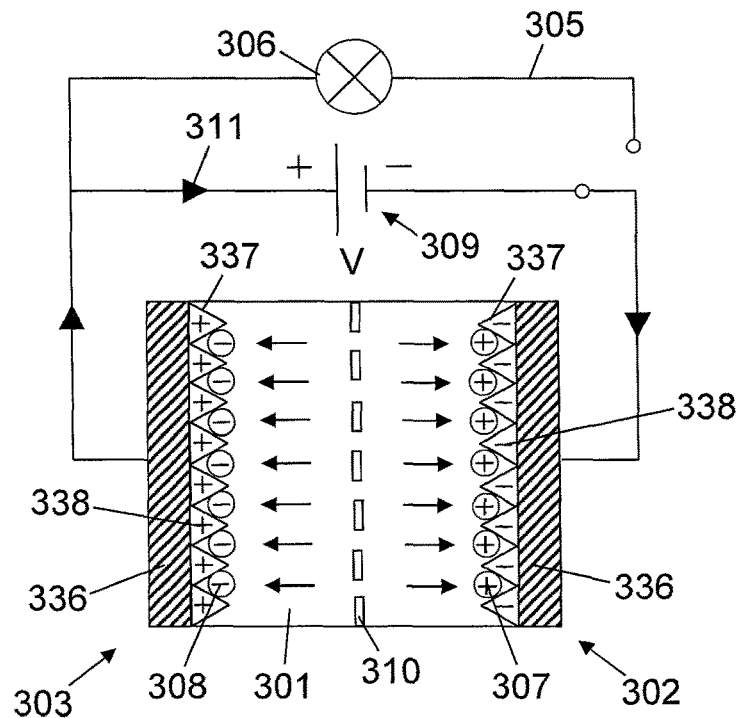
FIG. 3a illustrates schematically the charging process of a supercapacitor.
Figure 3B:
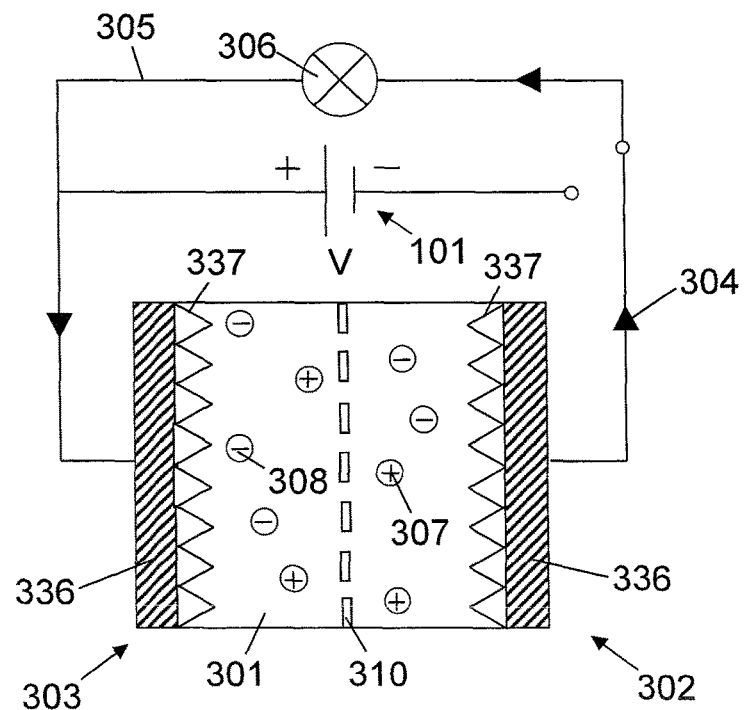
FIG. 3b illustrates schematically the discharge process of a supercapacitor.

FIGS. 3a and 3b illustrate schematically the charging and discharge processes of a supercapacitor, respectively. Supercapacitors have a cathode 303 and an anode 302, each comprising an electrically conducting plate 336 (charge collector), which are separated by an electrolyte 301. When a liquid electrolyte is used, the supercapacitor may also comprise a separator 310 to prevent direct physical contact between the cathode and anode. The plates 336 are coated in a porous material 337 (such as powdered carbon) to increase their surface area for greater charge storage. When a power supply (charger) applies a potential difference between the electrodes 302, 303, the electrolyte 301 becomes polarised. The potential on the cathode 303 attracts negative ions 308 in the electrolyte 301, and the potential on the anode 302 attracts positive ions 307.

Unlike batteries, the applied potential is kept below the breakdown voltage of the electrolyte 301 to prevent electrochemical reactions from taking place at the surface of the electrodes 302, 303. For this reason, supercapacitors cannot generate electricity like electrochemical cells. Also, without electrochemical reactions taking place, no electrons are generated. As a result, no significant current can flow between the electrolyte 301 and the electrodes 302, 303. Instead, the ions 307, 308 in solution arrange themselves at the surfaces of the electrodes 302, 303 to mirror the surface charge 338 and form an insulating "electric double layer". In an electric double layer (i.e. a layer of surface charge 338 and a layer of ions 307, 308), the separation of the surface charge 338 and ions 307, 308 is on the order of nanometers. The combination of the electric double layer and the use of a high surface area material 337 on the surface of the plates 336 allow a huge number of charge carriers to be stored at the electrode-electrolyte interface.

To discharge the supercapacitor, an electrical connection 305 is made between the charged electrodes 302, 303, causing electrons to flow from the anode to the cathode via the external circuit (as indicated by the arrows 304). This flow of charge can be used to power one or more electrical components 306 in the external circuit 305.

Supercapacitors have several advantages over batteries, and as a result, have been tipped to replace batteries in many applications. They function by supplying large bursts of current to power a device and then quickly recharging themselves. Their low internal resistance, or equivalent series resistance (ESR), permits them to deliver and absorb these large currents, whereas the higher internal resistance of a traditional chemical battery may cause the battery voltage to collapse. Also, whilst a battery generally demands a long recharging period, supercapacitors can recharge very quickly, usually within a matter of minutes. They also retain their ability to hold a charge much longer than batteries, even after multiple chargings. When combined with a battery, a supercapacitor can remove the instantaneous energy demands that would normally be placed on the battery, thereby lengthening the battery lifetime.

Whereas batteries often require maintenance and can only function well within a small temperature range, supercapacitors are maintenance-free and perform well over a broad temperature range. Supercapacitors also have longer lives than batteries, and are built to last until at least the lifetime of the electronic devices they are used to power. Batteries, on the other hand, typically need to be replaced several times during the lifetime of a device.

Supercapacitors are not without their drawbacks, however. Despite being able to store a greater amount of energy than conventional and electrolytic capacitors, the energy stored by a supercapacitor per unit weight is considerably lower than that of an electrochemical battery. In addition, the working voltage of a supercapacitor is limited by the electrolyte breakdown voltage, which is not as issue with batteries.

Lithium-ion batteries have the highest energy density of all systems, whilst supercapacitors have the highest power density and lifetime. Recently, a new hybrid storage device called a lithium-ion capacitor has been developed which aims to integrate the advantages of lithium-ion batteries and supercapacitors. The cathode of a lithium-ion capacitor employs activated carbon at which charges are stored as an electric double layer at the interface between the carbon and the electrolyte, similar to a supercapacitor. The anode, on the other hand, is made of a nanostructured intercalation material pre-doped with lithium ions, similar to a lithium-ion battery. This pre-doping process lowers the anode potential and results in a high cell output voltage. Typically, output voltages for lithium-ion capacitors are in the range of 3.8V to 4V. As a consequence, lithium-ion capacitors have a high energy density.

Furthermore, the capacity of the anode is several orders of magnitude greater than the capacity of the cathode. As a result, the change in anode potential during charging and discharging is far smaller than the change in cathode potential. The intercalation anode can also be coupled with an intercalation cathode, such as $LiCoO_2$ or $LiMn_2O_4$, to increase the power of the lithium-ion capacitor. The electrolyte used in a lithium-ion capacitor is typically a lithium-ion salt solution, and a separator may be used to prevent direct physical contact between the anode and cathode.

Figure 4A:
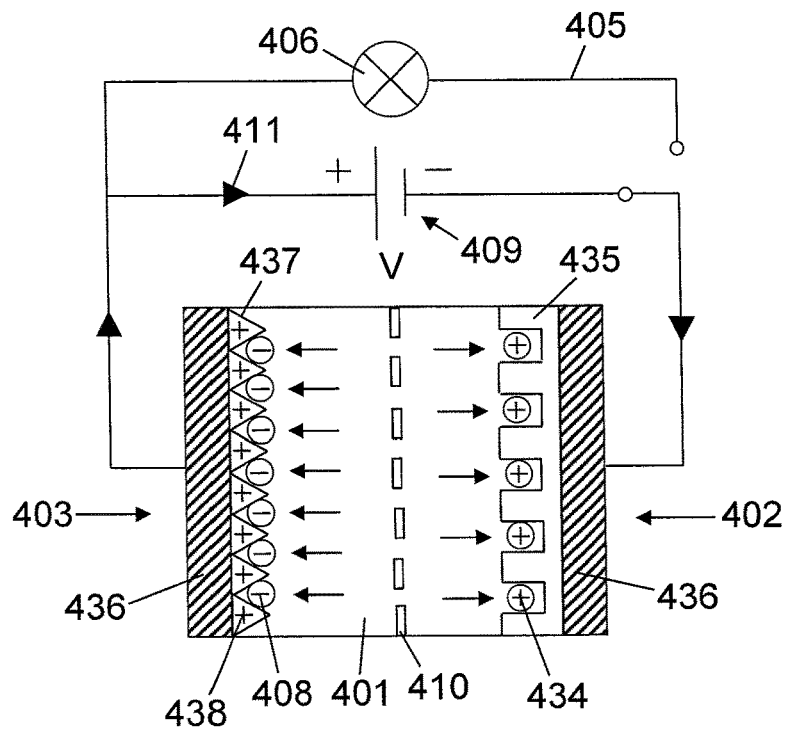
FIG. 4a illustrates schematically the charging process of a lithium-ion capacitor.
Figure 4B:
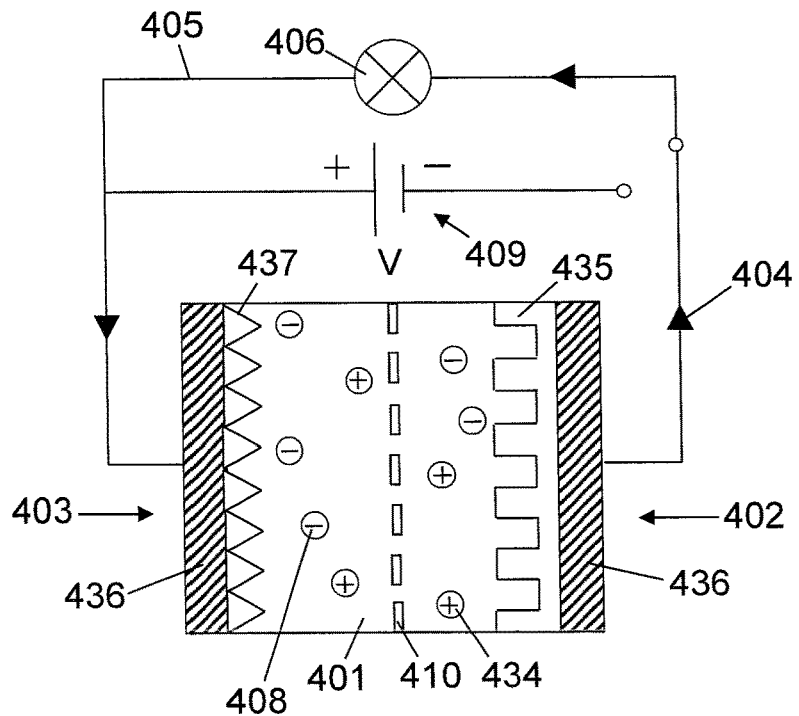
FIG. 4b illustrates schematically the discharge process of a lithium-ion capacitor.

FIGS. 4a and 4b illustrate schematically the charging and discharge processes of a lithium-ion capacitor, respectively. The behaviour of a lithium-ion capacitor is much the same as that of a supercapacitor, and therefore the reference numerals of FIGS. 4a and 4b correspond to similar features in FIGS. 3a and 3b. The main difference between the two systems, however, is that instead of positive ions in the electrolyte 401 arranging themselves at the electrode-electrolyte interface to form an electric double layer when the device charges, lithium ions 434 insert themselves (intercalation) into the crystal structure 435 of the anode 402. Like a lithium-ion battery, therefore, lithium-ion capacitors undergo fast electrochemical reactions and do not simply rely on the formation of an electric double layer to store electrical charge.

As stated in the background section, many of the high surface area electrode materials which have been considered for next generation storage cells suffer from low structural integrity and/or high resistance as a result of their particulate form. There will now be described an apparatus and associated methods that may provide a solution to this problem.

The present apparatus (as shown in FIG. 5) comprises a high surface area electrode (anode or cathode) on which the electrolyte and second electrode (cathode or anode, respectively) are deposited to form an electrical storage cell 525 (battery, capacitor or battery-capacitor hybrid). Unlike the particulate materials mentioned above, the high surface area electrode takes the form of an open interconnected wall structure 515 having one or more pores 517. The open interconnected wall structure 515 comprises a first electrode material 514 and serves as the first electrode (anode or cathode) of the storage cell 525. An electrolyte 522 and second electrode material 523 (cathode or anode, respectively) are deposited on top of the first electrode material 514 within the pores 517 of the open interconnected wall structure 515 such that the first electrode material 514 is separated from the second electrode material 523 by the electrolyte 522 to enable the generation and/or storage of electrical energy.

Since the open interconnected wall structure 515 is formed (at least in part) from the first electrode material 514, and the electrolyte 522 and second electrode material 523 are deposited on top of the first electrode material 514, the use of an open interconnected wall structure 515 increases the surface area of both electrodes and maximises the degree of interaction between the electrolyte 522 and the anode/cathode materials 514, 523.

In one embodiment (as shown in FIG. 5), the electrolyte 522 forms a coating on the open interconnected wall structure 515 and the second electrode material 523 fills the remaining volume of the pores 517 to form a closed, non-porous cell. Filling the pores 517 of the structure 515 with the second electrode material 523 prevents contaminant materials from entering the pores 517, but also increases the weight of the cell without any corresponding increase in storage density/capacity. In another embodiment (as shown in FIG. 6), the electrolyte 622 and second electrode material 623 form consecutive coatings on the open interconnected wall structure 615 without filling the entire volume of the pores 617.

A number of different interconnected wall structures 615 can be used provided that the structure 615 is open (via external pores 617). The open nature of the structure 615 allows the electrolyte 622 and second electrode material 623 to be deposited within the pores 617 of the structure 615.

Figure 7:
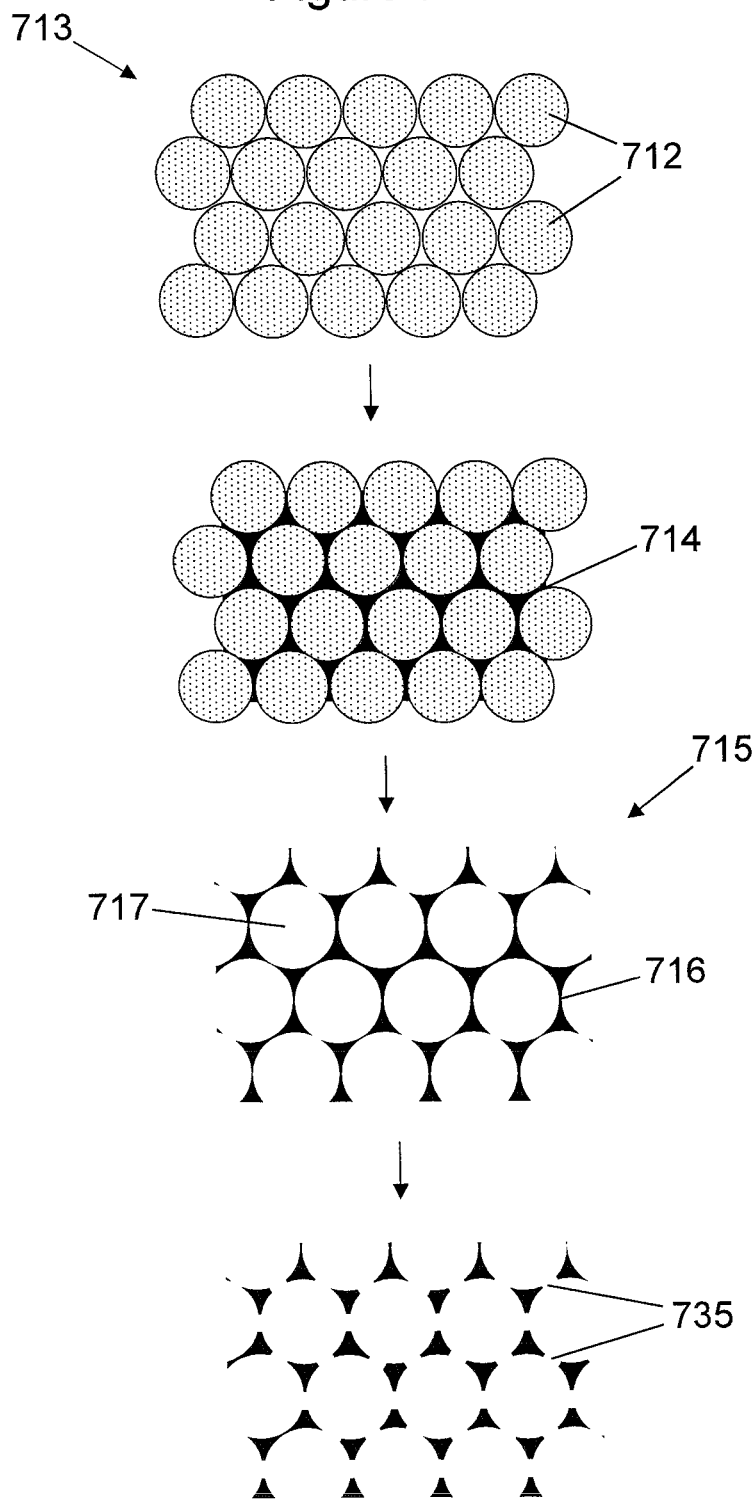
FIG. 7 illustrates schematically one method of forming an open interconnected wall structure using a lattice of spherical particles.

One example of an open interconnected wall structure 715 can be fabricated (as illustrated in FIG. 7) by arranging a plurality of spherical particles 712 (e.g. polystyrene particles) to form a lattice 713, and depositing the first electrode material 714 (e.g. by evaporation, sputtering, chemical vapour deposition (CVD), atomic layer deposition (ALD) or electrochemical deposition (ECD)) between the spherical particles 712. An open interconnected gyroid structure can be formed from using a block copolymer phase separation process.

CVD, ALD and ECD are particularly useful here because the deposition is independent on the orientation of the target surface. With evaporation and sputtering techniques, on the other hand, the target surface needs to be in the line-of-sight of the material source. Nevertheless, this issue can be addressed by using multiple material sources arranged to face different surfaces of the target structure, or by using a single material source and multiple deposition steps (and rotating the structure or material source between each deposition). Even if evaporation or sputtering are used to provide a complete coating, however, the coating is unlikely to have a uniform thickness due to the overlap from each deposition step. In this sense, CVD, ALD and ECD are preferable. ALD also has the advantage that it can produce pinhole free films. This factor is useful for forming an electrode of an electrical storage cell because pinholes in the first electrode material 714 can increase the electrical resistance of the cell. Pinholes in insulating layers can compromise the insulating behaviour of insulating layer.

Once the first electrode material 714 has been deposited, the spherical particles 712 can be removed (e.g. by etching, melting or dissolving the particles) to create pores in the structure. If the first electrode material 714 has completely coated the external surfaces of the particles 712, some or all of the coating may need to be removed (e.g. by wet or dry etching such as galvanostatic or potentiostat etching) to allow access to, and removal of, the spherical particles 712. The resulting structure 715 (albeit shown in cross-section in FIG. 7) is a three-dimensional arrangement of interconnecting walls 716 with channels 717 (pores) therebetween.

At this stage, however, the pores 717 of the structure 715 are not necessarily interconnected (although the walls would be interconnected to provide mechanical/structural integrity). As a result, some of the internal pores 717 may be inaccessible to the electrolyte and second electrode material, which reduces the useful surface area of the structure 715. This can be addressed (for example) by immersing the structure 715 in a bath of liquid (wet) etchant for a predetermined period of time. As the etching time increases, the number of interconnections 735 (and therefore the internal surface area of the material) increases, but the structural integrity decreases. The optimum etching time is therefore chosen to provide a sufficient surface area without compromising the rigidity of the structure 715, and will vary depending on the specific electrode material 714 and etchant used.

Figure 8:
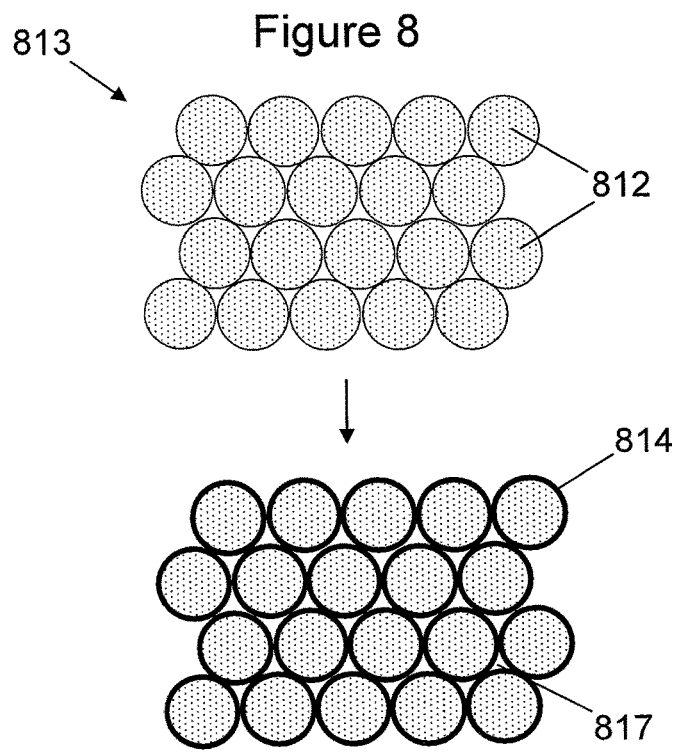
FIG. 8 illustrates schematically another method of forming an open interconnected wall structure using a lattice of spherical particles.

FIG. 8 illustrates an alternative method of fabricating the open interconnected wall (e.g. gyroid) structure. This time, instead of filling the spaces between the spherical particles 812 of the lattice 813, the first electrode material 814 is deposited as a coating on the particles 812. This may be performed simply by depositing a smaller amount of the first electrode material 814 so as to leave spaces between the particles 812. Since the spheres 812 are already packed together in the form of a lattice 813, the first electrode material 814 on the surface of one particle is in physical and electrical contact with the first electrode material on the surface of an adjacent particle. In this way, the resulting structure comprises a continuous layer of the first electrode material 814 and a plurality of interconnecting channels 817. The first electrode material 814 also serves to bind the particles together, thereby improving the structural integrity.

Whilst the above-mentioned fabrication processes refer to "spherical" particles, these techniques may also be performed using any appropriately shaped/sized particles (not necessarily all the same shape/size) provided that they are able to form a lattice comprising one or more pores or channels.

Figure 9:
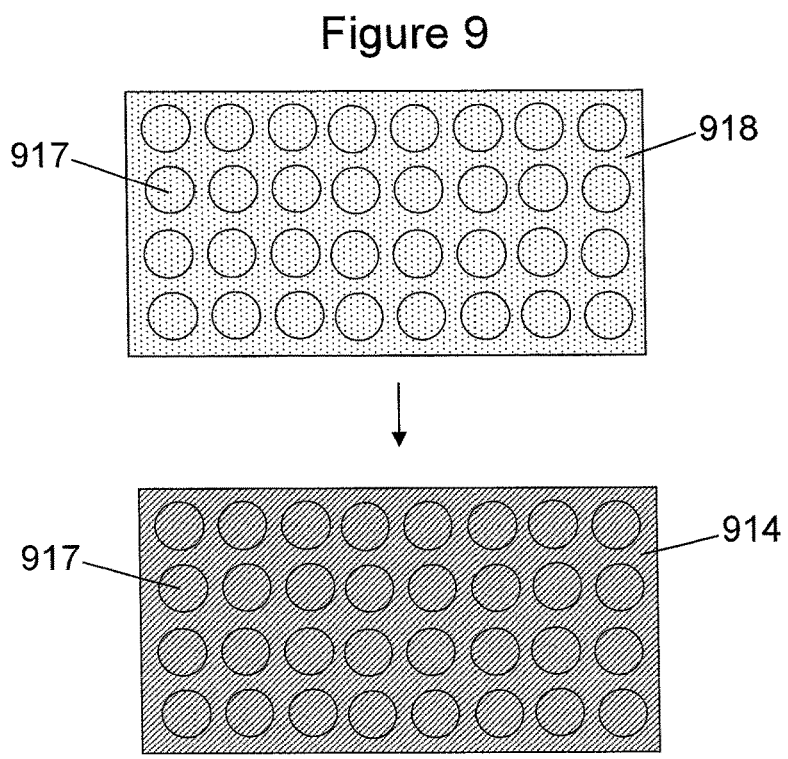
FIG. 9 illustrates schematically one method of forming an open interconnected wall structure using a block co-polymer comprising one or more pores.

FIG. 9 illustrates another method of fabricating the open interconnected wall (e.g. gyroid) structure. Instead of coating a lattice of spherical particles as shown in FIG. 8, however, the first electrode material 914 is deposited onto a block co-polymer 918. Block co-polymers 918 comprise two or more chemically distinct polymers (e.g. polystyrene and PMMA, polystyrene and polyimide, or polyfluorostyrene and polylactic for gyroids or double gyroids) linked together by a covalent bond at one end, and have the ability to self-assemble into a variety of ordered porous nanostructures. Depending upon the volume fraction of the components, block co-polymer nanoscopic domains (e.g. body-centred cubic spheres, hexagonally packed cylinders, lamellae, or bicontinuous gyroids) can be prepared under certain conditions. The molecular weight of the block co-polymer 918 and the individual blocks can be varied to control the size and separation distance of these nanoscopic domains.

Block copolymers 918 may comprise two or more homopolymer blocks. Block copolymers 918 with two or three distinct blocks are called diblock copolymers and triblock copolymers, respectively. Suitable diblock copolymers include poly(4-fluorostyrene)-b-poly(D,L-lactide) and poly(ethylene)-poly(ethylenepropylene), whilst a suitable triblock copolymer includes poly(1,4-isoprene)-block-polystyrene-block-poly(2-vinylpyridine). The cubic bicontinuous double gyroid phase of poly(4-fluorostyrene)-b-poly(D, L-lactide) allows the formation of an open interconnected wall structure in which the pores are fully interconnected.

The block co-polymer 918 in FIG. 9 comprises a plurality of ordered pores 917. When a layer of the first electrode material 914 is deposited onto the block co-polymer (preferably using CVD, ALD or ECD), it coats the external surface of the polymer 918 as well as the internal surfaces of the pores 917. The resulting structure therefore comprises a continuous layer of the first electrode material 914. The arrangement of the pores 917 within the structure will depend on the specific polymers and the fabrication conditions. In some cases the pores 917 may be interconnected, but in other cases they may not be. Interconnection of the pores 917 is not absolutely necessary, but it increases the surface area of the electrodes and therefore improves the storage density and capacity of the electrical storage apparatus. It will be appreciated that the block copolymer needs to have one of the polymer phases/blocks removed to make the porous structure. This can then be filled with the desired materials.

Rather than depositing the first electrode material onto a block co-polymer, it may be deposited on top of a sponge 1019 (natural or synthetic) as shown in FIG. 10. Sponges 1019 typically comprise a plurality of (interconnecting) pores 1017 and have an inherently high surface area. The external and internal surfaces of the sponge 1019 can therefore be coated with the first electrode material 1014 to create an open interconnected wall structure which is suitable for use as an electrode. As with the block co-polymer, it is not essential that the pores 1017 are connected to one another, but interconnected pores are beneficial.

Another alternative is to deposit the first electrode material 1114 onto a substrate 1120 (referred to herein as the base substrate) comprising one or more preformed holes 1117

(pores), as shown in FIG. 11. The pores 1117 may be formed in the substrate 1120 using a variety of techniques (e.g. drilling or etching through an etch-resistance mask). In this way, the number, density, diameter, depth and shape of the pores 1117 can be controlled. It is also possible to control whether the pores 1117 interconnect with one another or not. By coating the external and internal surfaces of the base substrate 1120, an open interconnected wall structure may be produced which is suitable for use as an electrode.

The pores in the open interconnected wall structure may form through channels (i.e. from one side of the material to the other, as denoted by reference numeral 1033) or blind channels (i.e. open at one side of the material but terminating inside the material, as denoted by reference numeral 917). In addition, the pores may (e.g. pores 917) or may not (e.g. pores 1017) be arranged periodically, and may have a diameter of less than 2 nm (microporous), between 2 nm and 50 nm inclusive (mesoporous), or greater than 50 nm (macroporous).

In each of the fabrication processes illustrated in FIGS. 8, 10 and 11, there is no need to remove the support material (spherical particles, sponge or base substrate) upon which the first electrode material is deposited. However, removal of the support material can be useful for two reasons. First of all, it can reduce the overall weight of the electrical storage device (which is an important factor given that storage cells are often characterised by their energy-to-weight ratio). Secondly, removal of the support material increases the surface area of the structure.

Figure 12:
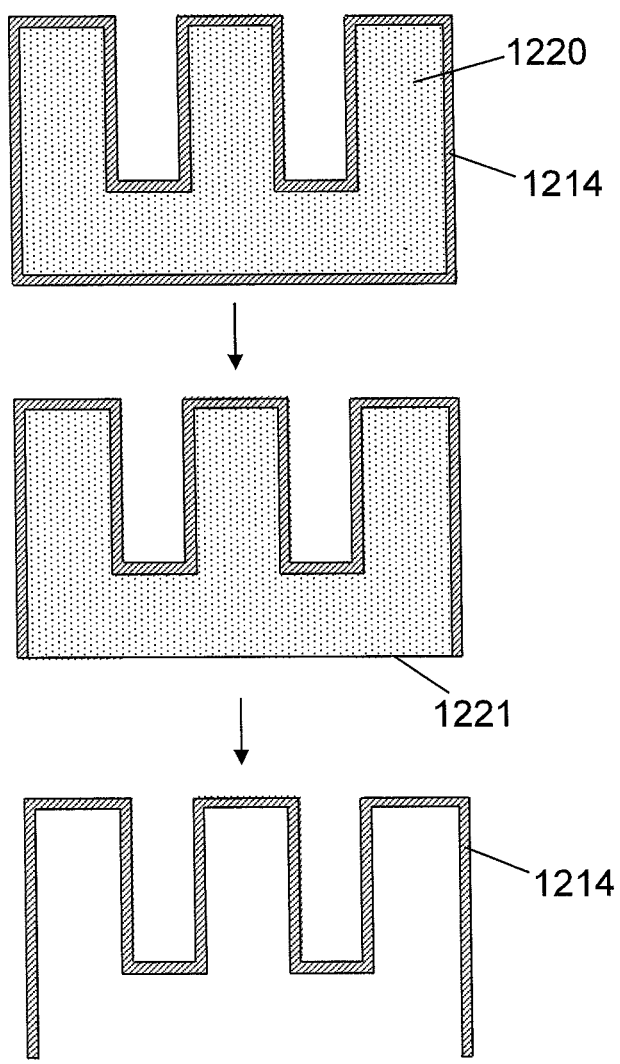
FIG. 12 illustrates schematically removal of the support material after deposition of the first electrode material.

This aspect is illustrated in FIG. 12 which shows the base substrate 1220 of FIG. 11 after being coated by the first electrode material 1214. To remove the support material 1220 (base substrate in this case), part of the first electrode material 1214 may need to be removed to provide access to the underlying material 1220. This step may be performed by etching. In the figure shown, the first electrode material 1214 at the lower surface 1221 of the base substrate 1220 has been removed. Once the substrate material 1220 is exposed, a wet etch (or an alternative technique) can be used to remove the substrate material 1220. It is important, however, that the first electrode material 1214 is more resistant to the etchant than the substrate material 1220, otherwise this step could partially or completely remove (or damage) the first electrode material. An alternative option may be to use an etch resistant mask to prevent interaction between the etchant and the first electrode material 1214. Removal of the substrate material 1220 results in an interconnected wall structure of first electrode material 1214 which is lightweight, open and porous, with a high surface area. The block copolymer fabrication process would apply a corresponding technique.

Nevertheless, the support material 1220 can provide mechanical support for the electrode and electrolyte materials. The decision on whether or not to remove the support material 1220 after deposition of the first electrode material 1214 will therefore depend partly on the mechanical strength of the first electrode material 1214. If the first electrode material 1214 is unable to support the electrolyte and second electrode materials on its own without mechanical deformation, the underlying support material 1220 may also be required.

Once the open interconnected wall structure has been formed, the electrolyte and second electrode material can be deposited onto the first electrode material to form the storage cell. As with deposition of the first electrode material onto the support material (e.g. base substrate), CVD, ALD and ECD are particularly useful because they can be used to coat surfaces which are not in the line-of-sight of the material source in an evaporation or sputtering system. It is not necessary to coat the entire surface area of the open interconnected wall structure with the electrolyte and second electrode material, but doing so maximises the generation and/or storage of electrons because the first electrode material is able to interact with a greater amount of electrolyte. Electrochemical deposition has the advantage that the material deposited has to be electrically connected to the base substrate for deposition to occur. This might not be the case for ALD or CVD.

FIG. 13 shows three, four, five and six-layer configurations of storage cell which can be formed using the open interconnected wall structure described herein. In the three-layer configuration (FIG. 13a), the support material 1320 (spherical particles, block co-polymer, sponge or base substrate) has been removed after deposition of the first electrode material 1314, and the first 1314 and second 1323 electrode materials (which are separated by the electrolyte 1322) each comprise an active material. The active material is the electrode material which takes part in the charging/discharging mechanism of the cell. If the electrical storage apparatus is a battery, the active material is an electrode material which participates in an electrochemical reaction or intercalation mechanism. On the other hand, if the electrical storage apparatus is a supercapacitor, the active material is an electrode material which participates in the formation of an electric double layer. As described above, removal of the support material 1320 increases the surface area of the first 1314 and second 1323 electrodes and reduces the overall weight of the electrical storage apparatus.

In the four-layer configuration (FIG. 13b), however, the support material 1320 has been retained after deposition of the first electrode material 1314. The support material 1320 may be required if the mechanical strength of the first electrode material 1314 on its own is insufficient to support the overlying electrolyte 1322 and second electrode material 1323.

Figure 13A:
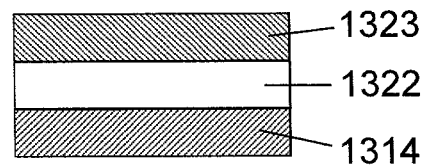
FIG. 13a illustrates schematically the layered structure of an electrical storage apparatus according to a first embodiment.
Figure 13B:
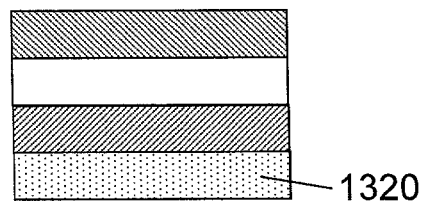
FIG. 13b illustrates schematically the layered structure of an electrical storage apparatus according to a second embodiment.

In the five-layer configuration (FIG. 13c), the support material 1320 has been removed after deposition of the first electrode material 1314, as per the configuration of FIG. 13a. This time, however, the first 1314 and second 1323 electrode materials each comprise a charge collection material 1324 as well as the active material. The charge collection material provides an electrical path between the active material of each electrode and the external circuitry of the storage cell to enable a flow of electrons, and may be required if the active material exhibits zero or a relatively low electrical conductivity. In some cases, the active material of one electrode may have a higher electrical conductivity than the active material of the other electrode. In this scenario, a charge collection material 1324 may only be required in the less conductive electrode. The material used to form the charge collector 1324 should be highly conductive. Suitable examples include metals such as gold, silver, nickel, copper, or an alloy comprising two or more of these metals. Nevertheless, a semiconducting material may be used instead.

Figure 13C:
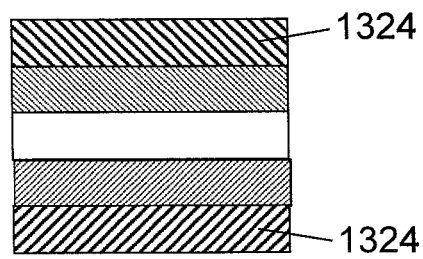
FIG. 13c illustrates schematically the layered structure of an electrical storage apparatus according to a third embodiment.
Figure 13D:
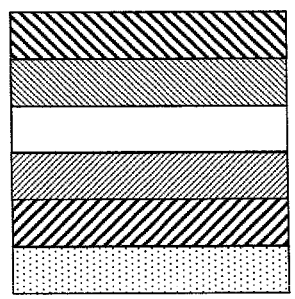
FIG. 13d illustrates schematically the layered structure of an electrical storage apparatus according to a fourth embodiment.

The six-layer configuration (FIG. 13d) is the same as the five-layer configuration of FIG. 13c, except that the support material 1320 has been retained after deposition of the first electrode material 1314.

The first 1314 and second 1323 electrode materials are not limited to any specific active materials, and may comprise a variety of different elements and compounds. The same is true of the electrolyte 1322, although the material used to form the electrolyte 1322 will depend largely on the chemistry of the active electrode materials.

In one embodiment, the electrical storage apparatus is a lithium sulphur battery in which the active material of the first electrode (anode) comprises lithium sulphide and the active material of the second electrode (cathode) comprises sulphur. Given that the electrical conductivity of sulphur is relatively low, it may need to be deposited on top of a charge collection material. The electrolyte may be a solid electrolyte such as lithium phosphorous oxynitride (LiPON), a polymer electrolyte containing poly(ethylene oxide) derivatives, or a polymer electrolyte containing borate ester groups.

During discharge of a lithium-sulphur battery, the lithium sulphide at the anode is split into lithium ions and sulphur, releasing electrons in the process. The lithium ions then migrate through the electrolyte to the sulphur cathode where they form lithium sulphide. During charging, on the other hand, the lithium sulphide at the cathode is converted back into sulphur and lithium ions, and the lithium ions migrate back through the electrolyte to the anode to produce lithium sulphide.

In another embodiment, the electrical storage apparatus is a lithium-air battery in which the active material of the first electrode (anode) comprises lithium oxide and the active material of the second electrode (cathode) comprises porous carbon and a metal catalyst (such as manganese, cobalt, ruthenium, platinum, silver, or a mixture of cobalt and manganese). The electrolyte in this embodiment may be an organic electrolyte (such as $LiPF_6$, $LiAsF_6$, $LiN(SO_2CF_3)_2$, or $LiSO_3CF_3$), an aqueous electrolyte (comprising a lithium salt dissolved in water), or a combination of an organic electrolyte and an aqueous electrolyte separated by a lithium-conducting membrane.

During discharge of the lithium-air battery, the lithium oxide at the anode is split into lithium ions and oxygen, releasing electrons in the process. The lithium ions then migrate through the electrolyte to the carbon cathode where they form lithium oxide. During charging, on the other hand, the lithium oxide at the cathode is converted back into oxygen and lithium ions, and the lithium ions migrate back through the electrolyte to the anode to produce lithium oxide.

In a further embodiment, the electrical storage apparatus is a lithium-ion battery. In this embodiment, the active material of the first electrode (cathode) could, for example, comprise lithium cobalt oxide, lithium iron phosphate or lithium manganese oxide; the active material of the second electrode (anode) could comprise graphite; and the electrolyte could comprise a lithium salt (such as lithium hexafluorophosphate, lithium hexafluoroarsenate monohydrate, lithium perchlorate, lithium tetrafluoroborate, or lithium triflate) in an organic solvent (such as ethylene carbonate or diethyl carbonate).

In yet another embodiment, the electrical storage apparatus is a lithium-ion capacitor. In this embodiment, the active material of the first electrode (anode) could, for example, comprise lithium cobalt oxide, lithium iron phosphate or lithium manganese oxide; the active material of the second electrode (cathode) could comprise activated carbon; and the electrolyte could comprise a lithium salt (such as lithium hexafluorophosphate, lithium hexafluoroarsenate monohydrate, lithium perchlorate, lithium tetrafluoroborate, or lithium triflate) in an organic solvent (such as ethylene carbonate or diethyl carbonate).

Figure 14:
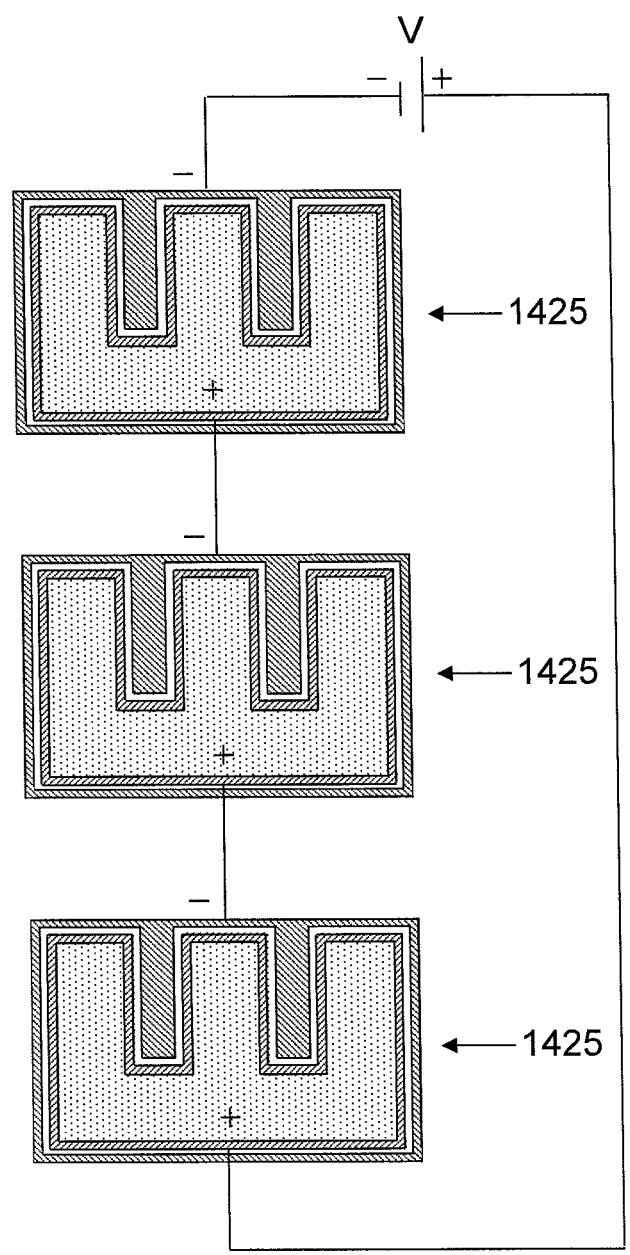
FIG. 14 illustrates schematically a plurality of electrical storage cells connected in series.

Given that electrical storage cells (battery, capacitor or batter-capacitor hybrid) are used to power other electronic components in a device, the electrical characteristics (e.g. operating current, voltage, resistance, capacitance, etc) of the cell are an important consideration. In general, the maximum operating voltage of a supercapacitor is limited by the breakdown voltage of the electrolyte (~1.1V for aqueous electrolytes and ~2.3V for organic electrolytes), whilst the maximum operating voltage of a battery is limited by the active materials used in the electrochemical reactions. In order to increase the operating voltage, however, several cells 1425 may be connected in series (e.g. as a stack of storage cells). As shown in FIG. 14, this may be achieved by electrically connecting the open interconnected wall structures to one another. The total voltage for three storage cells connected in series is given by $V_{total}=V_1+V_2+V_3$, where $V_n$ is the operating voltages of the respective cells. When connected in series, the total current is given by $I_{total}=I_1=I_2=I_3$, the total resistance is given by $R_{total}=R_1+R_2+R_3$, and the total capacitance (relevant for supercapacitors) is given by $C_{total}=1/C_1+1/C_2+1/C_3$, where $I_n$, $R_n$ and $C_n$ are the operating current, resistance and capacitance of the respective cells.

Figure 15:
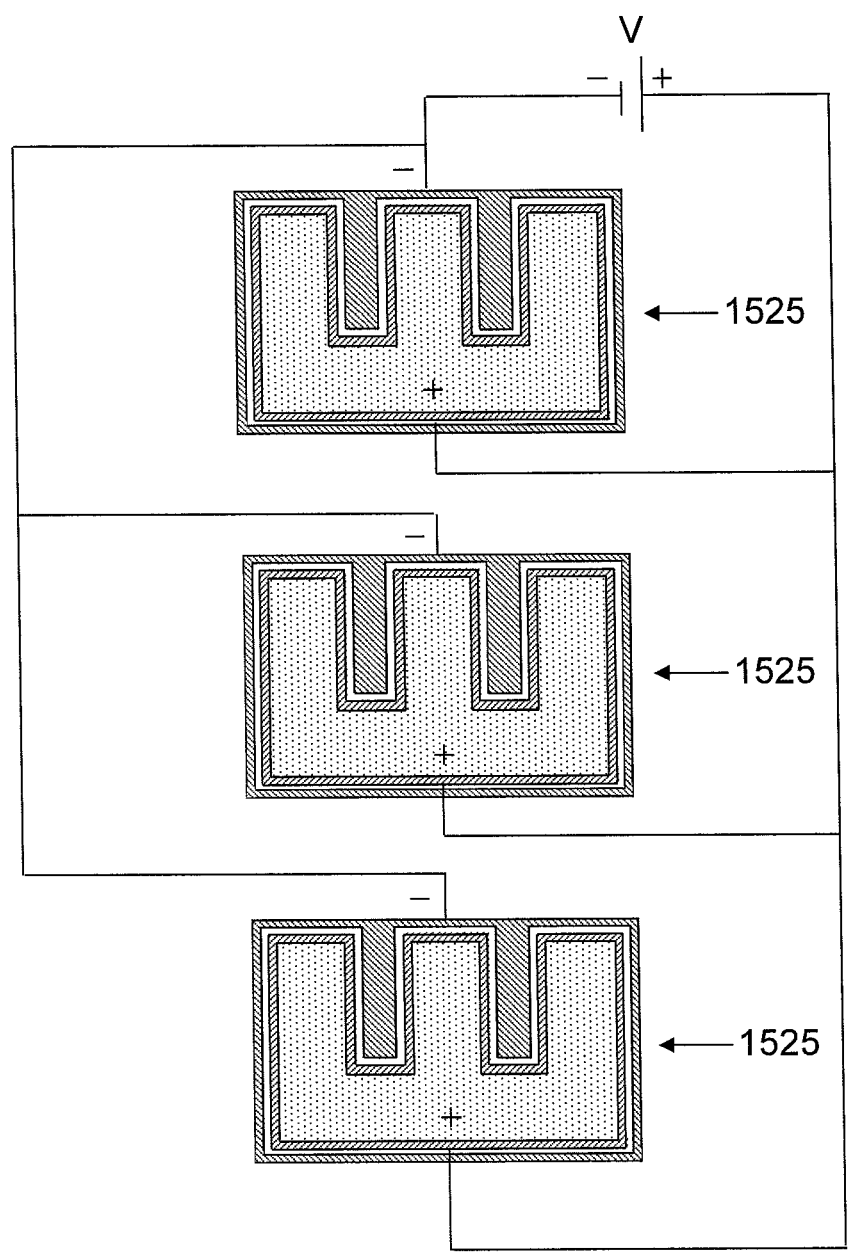
FIG. 15 illustrates schematically a plurality of electrical storage cells connected in parallel.

On the other hand, several cells 1425 could be connected in parallel (e.g. as a stack of storage cells). Again, this may be achieved by electrically connecting the open interconnected wall structures to one another, as shown in FIG. 15. In this configuration, the total voltage is given by $V_{total}=V_1=V_2=V_3$, the total current is given by $I_{total}=I_1+I_2+I_3$, the total resistance is given by $R_{total}=1/R_1+1/R_2+1/R_3$, and the total capacitance (relevant for supercapacitors) is given by $C_{total}=C_1+C_2+C_3$.

In the configurations of FIGS. 14 and 15, the individual cells may or may not have identical chemistries. For example, in one embodiment, each cell may be a battery or a supercapacitor, whilst in another embodiment, one cell may be a battery and another cell may be a supercapacitor. In the latter embodiment, the supercapacitor may be used to provide fast bursts of power, and the battery may be configured to charge the supercapacitor after each discharge operation. In situations where the chemistry of one cell is different from the chemistry of another cell, only part of the structure may be different (i.e. the first electrode material, electrolyte and/or second electrode material of one cell may be different from the first electrode material, electrolyte and/or second electrode material of another cell).

Figure 16:
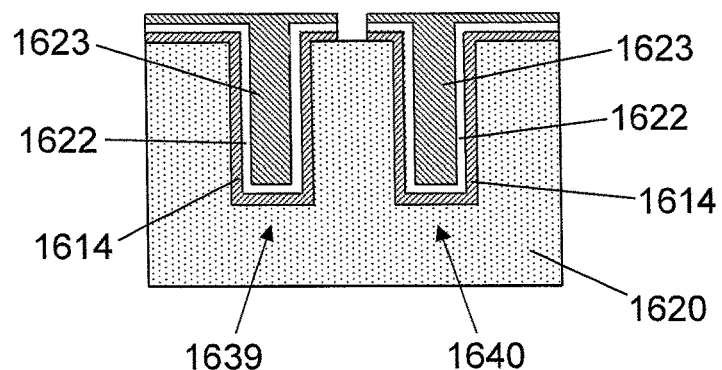
FIG. 16 illustrates schematically two electrical storage cells formed within the same open interconnected wall structure.

Rather than connecting the open interconnected wall structure of one cell to the open interconnected wall structure of another cell to form a stack of electrical storage cells, multiple cells may be formed from a single open interconnected wall structure (as shown in FIG. 16). This may be achieved by depositing the first electrode material 1614, electrolyte 1622 and second electrode material 1623 of one cell within a first pore 1639 of the structure, and depositing the first electrode material 1614, electrolyte 1622 and second electrode material 1623 of another cell within a second pore 1640 of the structure. As with the configurations of FIGS. 14 and 15, the first electrode material, electrolyte and/or second electrode material of one cell may or may not be the same as the first electrode material, electrolyte and/or second electrode material of another cell. As a result, a battery and a supercapacitor may be formed within the same open interconnected wall structure (for example).

It will be appreciated that techniques for forming the open interconnected wall structure have been disclosed; a block polymer route (in particular for producing gyroid structures) and a nanosphere lithography route. The latter route will create an opal, or inverse opal structure. The opal, or inverse opal structures will also achieve the end goal of a high-surface area electrode which has electrical connectivity to a current-collector substrate. In summary, (1) Block Copolymer Route The gyroid or double gyroid morphologies are typically (only) created by the phase separation of block copolymers. In this process a solution of the block copolymer is cast or coated onto a substrate, and in the present case, that substrate is likely to be a metal, and thus become the current collector of an energy storage device. As the solvent evaporates, the block copolymer forms a phase-separated film on the substrate. The phases are constituted of regions of the different immiscible polymer blocks, and note that a number of different phase-separation morphologies are possible, depending on the relative block lengths. Many of these morphologies (gyroid, double gyroid, hexagonal pillar array, vertically-oriented lamellae) are likely to be useful in the present application, namely those which have a continuous pathway to the substrate (and thus can create structures with electrically conducting pathways to the substrate).

Note that, at this point, the film is entirely solid (bar a residue of solvent). In order to use the polymer structure so-formed, removal of one of the polymer phases would be required to leave behind the necessary porous structure. This can be achieved by wet chemical etch, UV exposure, or a mixture of the two depending on the polymer to be removed. This process leaves behind a polymer scaffold, which can be used to template the materials of interest. The methods previously discussed can be used to coat the polymer scaffold—ALD, CVD or electrochemical deposition. The latter technique is especially useful, since if the current collector substrate is used as one of the deposition electrodes, it can be assured that the deposited material is electrically continuous to the substrate as needed. The possible disadvantage of this method is that it may totally fill the pores, so a multilayer coating may not so feasible.

Two strategies are now possible. The polymer scaffold remaining can either be used as a permanent feature, or it may be sacrificial. We can employ both approaches, but leaving the polymer scaffold behind is not as an attractive a strategy since it is functionally inactive and takes up useful space that might be filled with active material. If the scaffold is to remain, it is possible to build up layers of materials (electrode 1, solid electrolyte, electrode 2, etc) to create the desired structure. This approach may not be very easy if the pore diameter is very small.

Alternatively, and advantageously, one can totally fill the pores with an (electrode) material using one of the methods above, then remove the scaffold to leave the electrode material, which is in a wire-like network—the pore network. Subsequent materials (electrolyte, second electrode, etc) may then be back filled into the "inverse" scaffold using ALD, CVD or electrochemical deposition.

(2) Opal Route.

As mentioned above, self-assembled crystals of polymer micro or nanospheres are created and used to template the deposition of the battery materials. In this case, the structure formed is a type of opal (face-centred cubic crystal).

Figure 17:
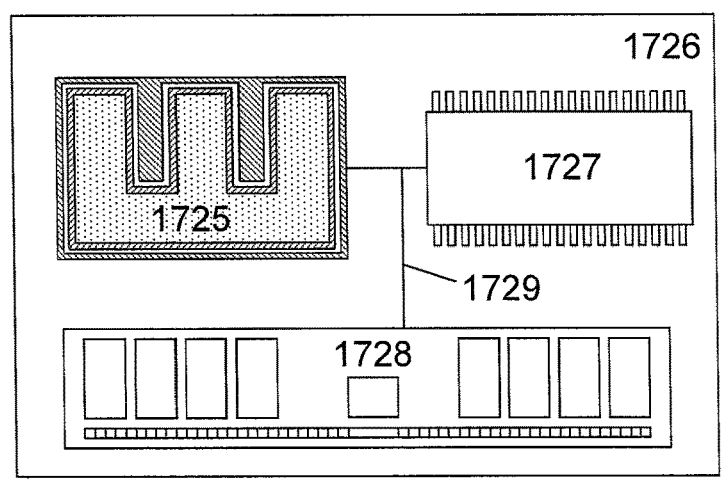
FIG. 17 illustrates schematically an electronic device comprising the apparatus described herein.

FIG. 17 illustrates schematically a device 1726 comprising the electrical storage apparatus 1725 described herein. The device 1726 also comprises a processor 1727 and a storage medium 1728, which are electrically connected to one another by a data bus 1729. The device 1726 may be an electronic device, a portable electronic device, a portable telecommunications device, or a module for any of the aforementioned devices. With regard to FIGS. 5, 6, 14, 17 and 18, it will be appreciated that these show respective schematic illustrations of an electrical storage apparatus. It will be further appreciated that the respective anode and cathode layers are electrically separated to avoid short-circuiting which would occur if, for example, wires were used from the anode through the cathode, or vice versa.

The electrical storage apparatus 1725 is configured to generate and/or store electrical energy, which may be used to power one or more components of the device 1726. The processor 1727 is configured for general operation of the device 1726 by providing signalling to, and receiving signalling from, the other device components to manage their operation. The storage medium 1728 is configured to store computer program code configured to perform, control or enable operation of the electrical storage apparatus 1725. The storage medium 1728 may also be configured to store settings for the other device components. The processor 1727 may access the storage medium 1728 to retrieve the component settings in order to manage operation of the device components. In particular, the storage medium 1728 may comprise voltage settings for charging the electrical storage apparatus 1725. The internal connections 1729 between the processor 1727 and storage medium 1728 can be understood to provide active coupling between the processor 1727 and storage medium 1728 to allow the processor 1727 to access the computer program code stored on the storage medium 1728. The storage medium 1728 may be a temporary storage medium such as a volatile random access memory. On the other hand, the storage medium 1728 may be a permanent storage medium such as a hard disk drive, a flash memory, or a non-volatile random access memory.

Figure 18:
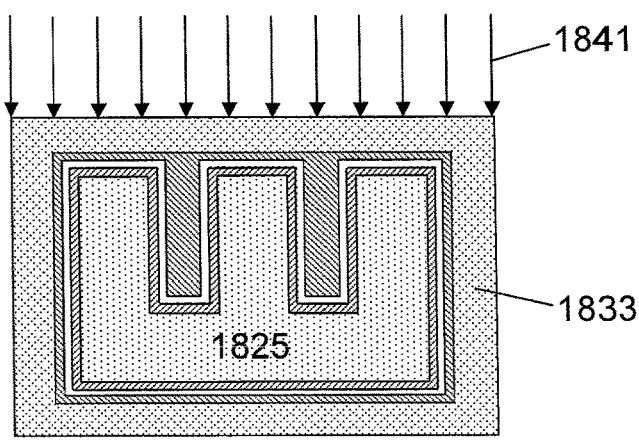
FIG. 18 illustrates schematically an electrical storage apparatus comprising a solar cell formed thereon.

The device 1726 may also comprise a solar cell 1833 configured to convert energy from electromagnetic radiation 1841 incident upon the solar cell 1833 into electrical energy. The electrical storage apparatus 1825 described herein may be configured to store this energy for subsequent use. In one embodiment, as shown in FIG. 18, the solar cell 1833 forms a coating on the external surface of the electrical storage apparatus 1825. This configuration ensures that electromagnetic radiation 1841 incident from any angle may be converted into electrical energy and therefore provides greater design freedom for the arrangement of components inside the device 1726. When the electrical storage apparatus 1825 has the configuration shown in FIG. 6, encasing the electrical storage apparatus 1825 within the solar cell 1833 also helps to prevent contaminant materials from entering the pores of the open interconnected wall structure.

Figure 19:
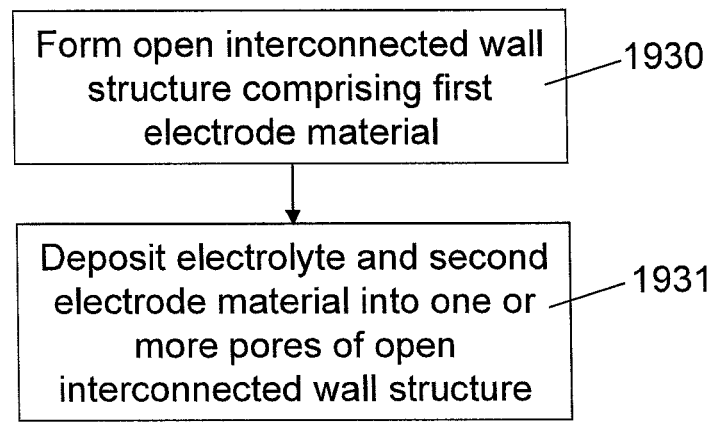
FIG. 19 illustrates schematically a method of making the apparatus described herein.

The main steps 1930-1931 of the method used to make the electrical storage apparatus 1725 are illustrated schematically in FIG. 19.

Figure 20:
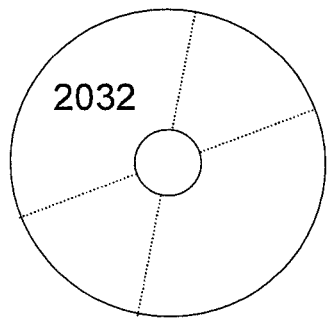
FIG. 20 illustrates schematically a computer readable medium providing a program for controlling the method of FIG. 19.

FIG. 20 illustrates schematically a computer/processor readable medium 2032 providing a computer program according to one embodiment. In this example, the computer/processor readable medium 2032 is a disc such as a digital versatile disc (DVD) or a compact disc (CD). In other embodiments, the computer/processor readable medium 2032 may be any medium that has been programmed in such a way as to carry out an inventive function. The computer/processor readable medium 2032 may be a removable memory device such as a memory stick or memory card (SD, mini SD or micro SD).

The computer program may comprise computer code configured to perform, control or enable deposition of an electrolyte and a second electrode material into one or more pores of an open interconnected wall structure to provide an open interconnected wall structure comprising a first electrode material, the pores comprising the electrolyte and the second electrode material, wherein the electrolyte and second electrode material are supported on the first electrode material within the pores such that the first electrode material is separated from the second electrode material by the electrolyte to enable the generation and/or storage of electrical energy using the apparatus.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   a substrate comprising an open interconnected wall structure of electrically conductive material having two or more pores that define two or more cells;
   a battery structure defined by a first of the two or more cells, the battery structure comprising:
      a first active material in a first of the two or more pores and comprising a first electrode material supported by the open interconnected wall structure;
      an electrolyte on the first electrode material; and
      a second active material comprising a second electrode material on the electrolyte in the first of the two or more pores; and
   a capacitor structure defined by a second of the two or more cells, the capacitor structure comprising:
      the first active material in a second of the two or more pores and comprising the first electrode material supported by the open interconnected wall structure;
      the electrolyte on the first electrode material; and the second active material comprising a different second electrode material on the electrolyte in the second of the two or more pores;

wherein the electrolyte and each of the second electrode materials are supported on the first electrode material within the pores such that the first electrode material is separated from each of the second electrode materials by the electrolyte to enable the generation of electrical energy from the first of the two or more pores defining the first of the two or more cells and the storage of electrical energy at the second of the two or more pores defining the second of the two or more cells during use of the apparatus;

wherein the first and second electrode materials each comprise the first and the second active materials respectively, at least one of the active materials comprising an electrically insulating lithium-based compound configured for use in generating and/or storing electrons; and wherein the open interconnected wall structure is configured to act as a charge collector for the generated and/or stored electrons through which an electrical path for the electrons is provided.

2. The apparatus of claim 1, wherein the electrolyte forms a coating on the open interconnected wall structure and the second electrode material substantially fills the remaining volume of the pores.

3. The apparatus of claim 1, wherein the first and/or second electrode material comprises a charge collection material, and wherein the active material is in physical contact with the charge collection material.

4. The apparatus of claim 1, wherein the first electrode material forms the open interconnected wall structure.

5. The apparatus of claim 1, wherein the open interconnected wall structure comprises a substrate on which the first electrode material is supported.

6. The apparatus of claim 1, wherein one of some or all of the pores are interconnecting, some or all of the pores form through channels within the open interconnected wall structure, some or all of the pores form blind channels within the open interconnected wall structure, some of all of the pores are arranged periodically, and some or all of the pores have a diameter of between 2 nm and 50 nm inclusive.

7. The apparatus of claim 1, wherein the first electrode material, electrolyte and/or second electrode material within one pore is different from the first electrode material, electrolyte and/or second electrode material within another pore.

8. The apparatus of claim 1, wherein the apparatus comprises a plurality of the open interconnected wall structures electrically connected to one another.

9. The apparatus of claim 8, wherein the first electrode material, electrolyte and/or second electrode material of one open interconnected wall structure is different from the first electrode material, electrolyte and/or second electrode material of another open interconnected wall structure.

10. A device comprising the apparatus of claim 1.

11. The device of claim 10, wherein the device is one or more of an electronic device, a portable electronic device, a portable telecommunications device, and a module for any of the aforementioned devices.

12. The device of claim 10, wherein the device comprises a solar cell configured to convert energy from electromagnetic radiation incident upon the solar cell into electrical energy, and wherein the apparatus is configured to store said electrical energy.

13. The apparatus of claim 1, wherein the open interconnected wall structure has a gyroid structure defined by a configuration of spherical particles that form a lattice and wherein the gyroid structure is trigonometrically approximated by the equation $\cos x \sin y + \cos y \sin z + \cos z \sin x = 0$.

14. The apparatus of claim 13, wherein the gyroid structure comprises a cubic bicontinuous double gyroid phase of poly(4-fluorostyrene)-b-poly(D,L-lactide).

15. The apparatus of claim 1,
wherein the first electrode material is lithium cobalt oxide, lithium iron phosphate, or lithium manganese oxide;
wherein the second electrode material in the first of the two or more pores is graphite;
wherein the different second electrode material in the second of the two or more pores is activated carbon; and
wherein the electrolyte is a lithium salt.

16. The apparatus of claim 13, wherein the gyroid structure comprises a block copolymer comprising polyfluorostyrene and a polylactide.

* * * * *